(12) United States Patent
Hubbard et al.

(10) Patent No.: US 11,783,395 B2
(45) Date of Patent: Oct. 10, 2023

(54) DECENTRALIZED IDENTITY STORAGE FOR TOBACCO PRODUCTS

(71) Applicant: RAI Strategic Holdings, Inc., Winston-Salem, NC (US)

(72) Inventors: Sawyer Hubbard, Winston-Salem, NC (US); Jared Aller, Winston-Salem, NC (US); Rajesh Sur, Winston-Salem, NC (US)

(73) Assignee: RAI Strategic Holdings, Inc., Winston-Salem, NC (US)

(*) Notice: Subject to any disclaimer, the term of this patent is extended or adjusted under 35 U.S.C. 154(b) by 289 days.

(21) Appl. No.: 16/415,477

(22) Filed: May 17, 2019

(65) Prior Publication Data

US 2020/0342507 A1 Oct. 29, 2020

Related U.S. Application Data

(60) Provisional application No. 62/838,272, filed on Apr. 24, 2019.

(51) Int. Cl.
| | |
|---|---|
| *G06Q 30/00* | (2023.01) |
| *G06Q 30/0601* | (2023.01) |
| *G06Q 20/18* | (2012.01) |
| *G06Q 20/20* | (2012.01) |
| *G06Q 20/38* | (2012.01) |
| *G06Q 20/40* | (2012.01) |

(52) U.S. Cl.
CPC ......... *G06Q 30/0607* (2013.01); *G06Q 20/18* (2013.01); *G06Q 20/202* (2013.01); *G06Q 20/389* (2013.01); *G06Q 20/4014* (2013.01); *G06Q 30/0609* (2013.01); *G06Q 30/0631* (2013.01)

(58) Field of Classification Search
CPC ...................................................... G06Q 30/00
See application file for complete search history.

(56) References Cited

U.S. PATENT DOCUMENTS

| | | | |
|---|---|---|---|
| 10,806,178 B1* | 10/2020 | He | G06Q 20/18 |
| 2015/0100441 A1* | 4/2015 | Alarcon | G07F 15/006 |
| | | | 705/16 |
| 2017/0091853 A1* | 3/2017 | Cameron | G06Q 30/0637 |

(Continued)

OTHER PUBLICATIONS

Anonymous, "Juul could save itself in 60 days with Blockchain", Blocklr, dated Sep. 19, 2018. (Year: 2018).*

(Continued)

*Primary Examiner* — Mark A Fadok
(74) *Attorney, Agent, or Firm* — BURR & FORMAN LLP

(57) ABSTRACT

Identity information can be stored in a decentralized structure. The identity information may include age verification information for the purchase or operation of certain tobacco products, such as an electronic nicotine delivery systems ("ENDS") device, which may include aerosol delivery devices. The tobacco products or devices may have an age verification requirement or other identity requirements needed to authenticate a user and that information must be stored. A decentralized structure for storing the identity information may improve the security of that identity information while also providing a mechanism for accessing the information for verification or authentication purposes.

13 Claims, 16 Drawing Sheets

(56) References Cited

U.S. PATENT DOCUMENTS

| | | | |
|---|---|---|---|
| 2018/0020724 A1* | 1/2018 | Alarcon | G06F 16/22 |
| | | | 717/168 |
| 2018/0130050 A1* | 5/2018 | Taylor | H04L 9/3236 |
| 2019/0050921 A1* | 2/2019 | Ryner | G06Q 20/3224 |
| 2019/0197225 A1* | 6/2019 | Khalifa | G06F 21/335 |
| 2020/0085105 A1* | 3/2020 | Barbaric | G06F 9/542 |

OTHER PUBLICATIONS

Barouski, Aliaksandr, "The challenges forage verification for online vaping retailers", openaccessgovernment, dated Apr. 29, 2019. (Year: 2019).*

Guest, "Blockchain: what is it and how can we use it?", Techno FAQ, dated Aug. 29, 2016 (Year: 2016).*

\* cited by examiner

DECENTRALIZED IDENTITY STORAGE FOR TOBACCO PRODUCTS

PRIORITY CLAIM

This application claims priority to U.S. Provisional App. No. 62/838,272, filed on Apr. 24, 2019, entitled "DECENTRALIZED IDENTITY STORAGE FOR TOBACCO PRODUCTS," the entire disclosure of which is hereby incorporated by reference.

TECHNOLOGICAL FIELD

The present disclosure relates to a system for managing an identity of a consumer, such as for a user of an age restricted product, such as any tobacco product including electronic nicotine delivery systems ("ENDS") and aerosol delivery devices. The management of user data may include a decentralized identity management or storage system that may be used for age verification.

BACKGROUND

Many devices have been proposed through the years as improvements upon, or alternatives to, smoking products that require combusting tobacco for use. Some example alternatives have included devices wherein a solid or liquid fuel is combusted to transfer heat to tobacco or wherein a chemical reaction is used to provide such heat source. Additional example alternatives use electrical energy to heat tobacco and/or other aerosol generating substrate materials, such as described in U.S. Pat. No. 9,078,473 to Worm et al., which is incorporated herein by reference. Generally, a device using electrical energy to heat tobacco or other substances may be referred to as an electronic nicotine delivery systems ("ENDS") device.

Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous alternative smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 8,881,737 to Collett et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0096781 to Sears et al., U.S. Pat. App. Pub. No. 2014/0096782 to Ampolini et al., U.S. Pat. App. Pub. No. 2015/0059780 to Davis et al., and U.S. patent application Ser. No. 15/222,615 to Watson et al., filed Jul. 28, 2016, all of which are incorporated herein by reference. See also, for example, the various implementations of products and heating configurations described in the background sections of U.S. Pat. No. 5,388,594 to Counts et al. and U.S. Pat. No. 8,079,371 to Robinson et al., which are incorporated by reference.

The smoking articles described above may be subject to certain restrictions, including age restrictions. In some countries, use of the articles is limited based on user age. In order to verify a user's age, that user may need to be identified and information about that user must be stored. Improperly storing personal and identifying information can cause numerous problems if there were a data breach. An improved user identification storage process may be needed to confirm compliance with the restrictions and ensure that private data is secure.

BRIEF SUMMARY

The present disclosure relates to a decentralized structure for storing identity information. The identity information may include age verification information and may be used for the operation of an electronic nicotine delivery systems ("ENDS") device, which may include aerosol delivery devices such as smoking articles that produce aerosol. The ENDS or aerosol delivery devices may have an age verification requirement or other identity requirements needed to authenticate a user and that information must be stored. A decentralized structure for storing the identity information may improve the security of that identity information while also providing a mechanism for accessing the information for verification or authentication purposes. The decentralized structure or decentralized identity management system may utilize Blockchain technology for storing personal or identification information. Conversely, because a centralized structure (e.g. a database) stores the information in one location, that location may be vulnerable to hacking and may be a security risk.

In one embodiment, a system includes a network and a decentralized storage of data coupled with the network and the decentralized storage utilizes Blockchain technology. The system includes a user device coupled with the network and configured to communicate with the decentralized storage. The communication includes personal identifying information about the user that is sent from the user device for storage at the decentralized storage. The personal identifying information is provided from the decentralized storage for identifying a user and for verifying an age of a user. This system may further include an aerosol delivery device coupled with the user device, such that operation of the aerosol delivery device by a user depends on authenticating the personal identifying information from the decentralized storage for that user. The aerosol delivery device may not operate unless the user is authenticated. The system may further include a vending machine for selling age-restricted products that is configured to communicate with the decentralized storage for verifying a user's identity and age based on the personal identifying information about that user that is stored with the decentralized storage. In one example, the vending machine may not sell the age-restricted products unless the identity and the age of the user is verified. In one example, the vending machine may be a self-service kiosk and/or the age-restricted products may include aerosol delivery devices. In another example, the vending machine may include a roving vending machine that can act as a pop-up shop for aerosol delivery devices, accessories, and/or chargers. In another example, payment information may be stored at the decentralized storage and provided with the authenticating from the decentralized storage.

In one embodiment, a method for providing an age-restricted may include requesting identity information for a user from a decentralized storage and receiving, from the decentralized storage, the identity information. The method may include verifying an age of a user based on the identity information, accepting a payment for the age-restricted product after the age of the user is verified, and providing the age-restricted product after the accepting of the payment. In one example, the method may include registering a user with the decentralized storage by providing identity information to the decentralized storage. In one example, the age verification may include confirming the user matches the identity information. In one example, the decentralized storage includes storage with Blockchain technology, and the identity information for the user is stored in a particular Blockchain. In one example, each item of the identity information for the user is stored in a subsequent block for the particular Blockchain. Further, the payment may be confirmed by checking the identity information from the decentralized storage. In one example, the method may include tracking a chain of custody of the age-restricted product by adding each interaction to the decentralized storage. The method may further include utilizing, by a trade marketing representative, the age verification for recommending additional products or services. In one example, the age-restricted product may include an aerosol delivery device. In one example, the transaction data from the payment transaction may be added to the decentralized storage and associated with the identity information.

In one embodiment, a method may include storing identity information in a decentralized storage. The decentralized storage may be modified with a request for the identity information. The modifying may include adding a block to the decentralized storage. Prior blocks with the identity information are unchanged. For identity verification, there is a request for at least a portion of the identity information from the decentralized storage.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE FIGURES

Figure 1:
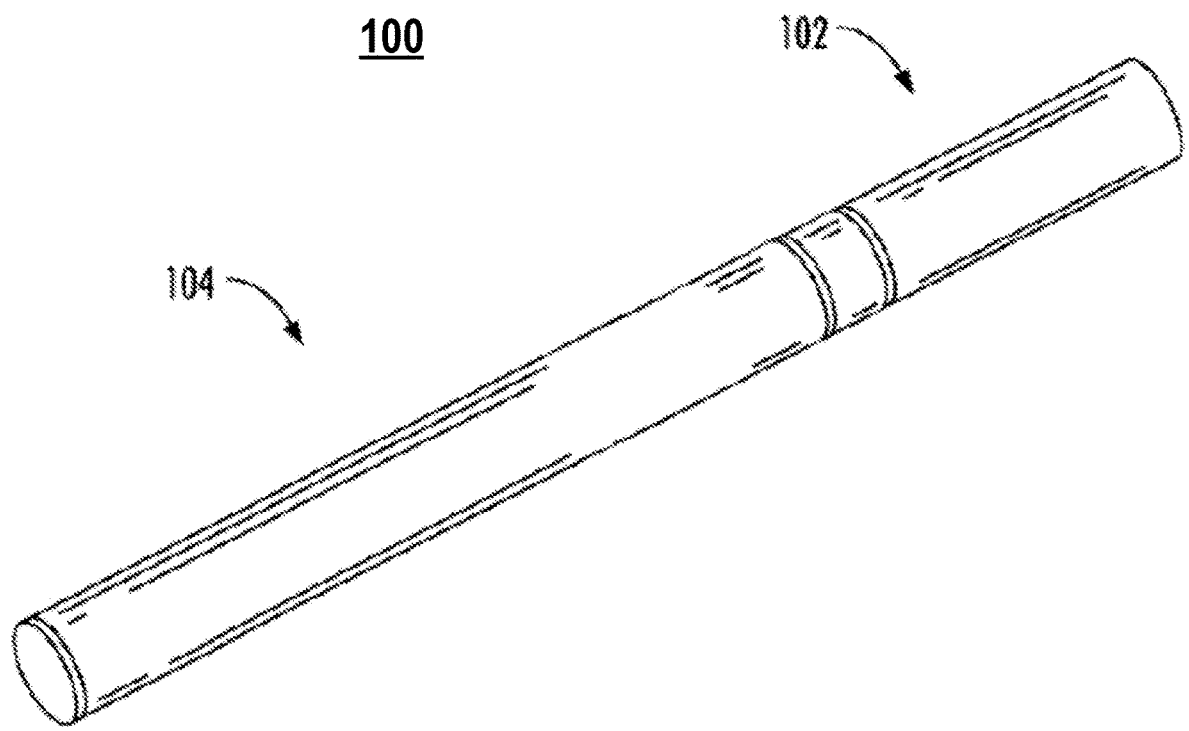
Figure 2:
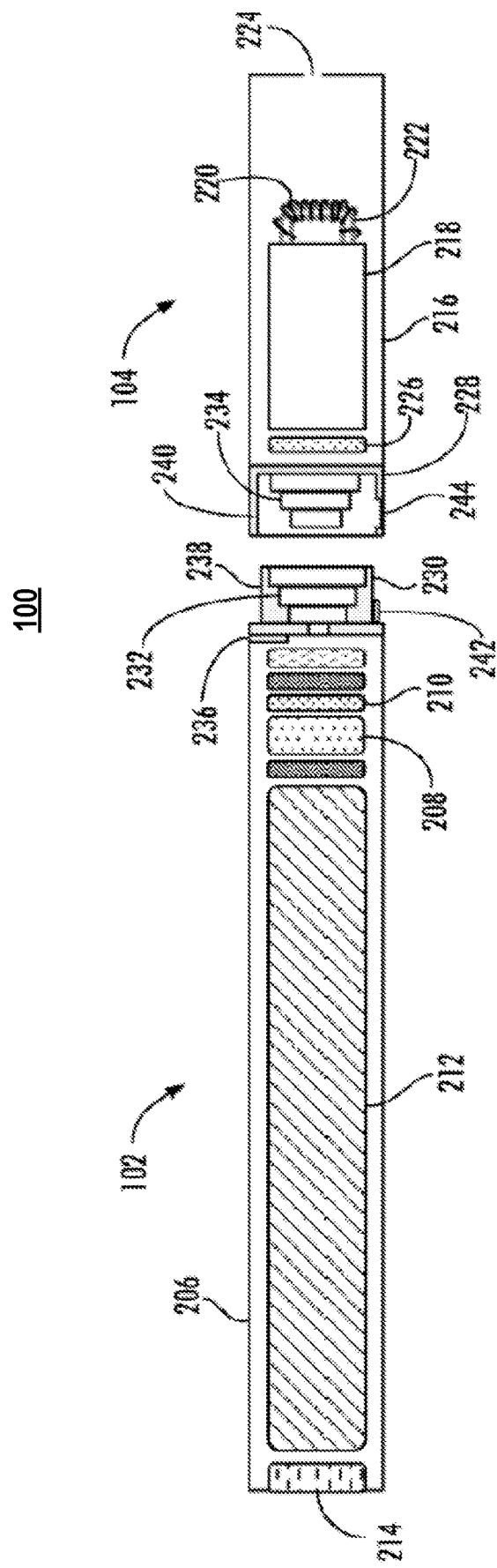
Figure 3:
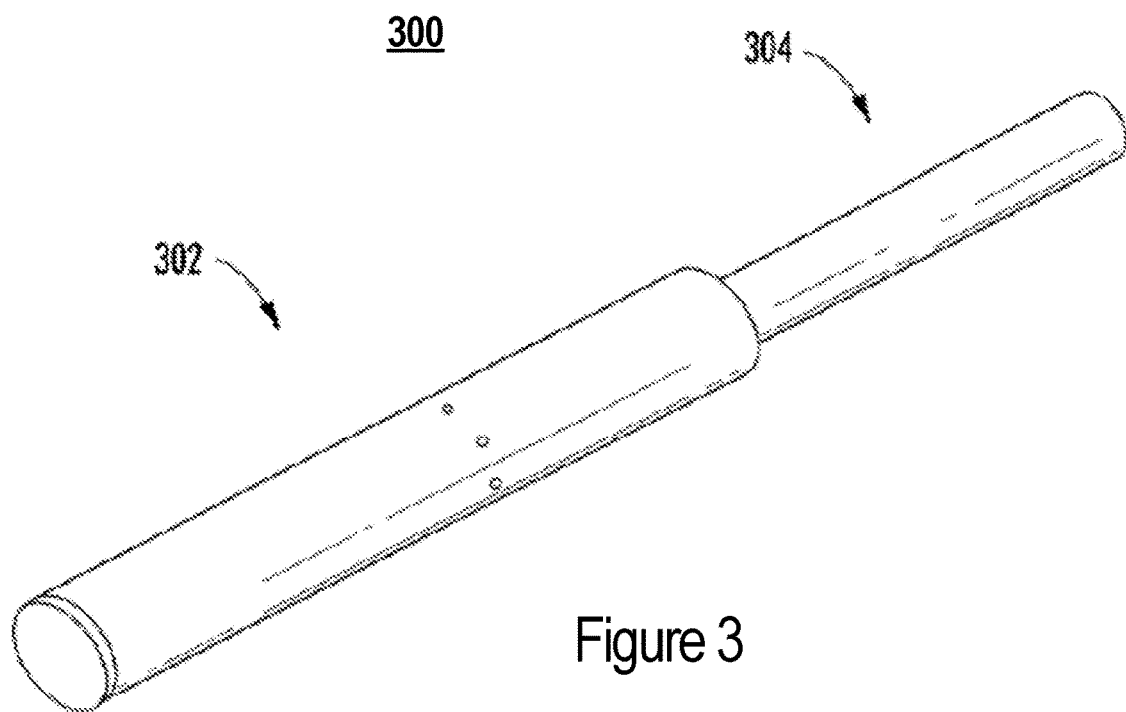
Figure 4:
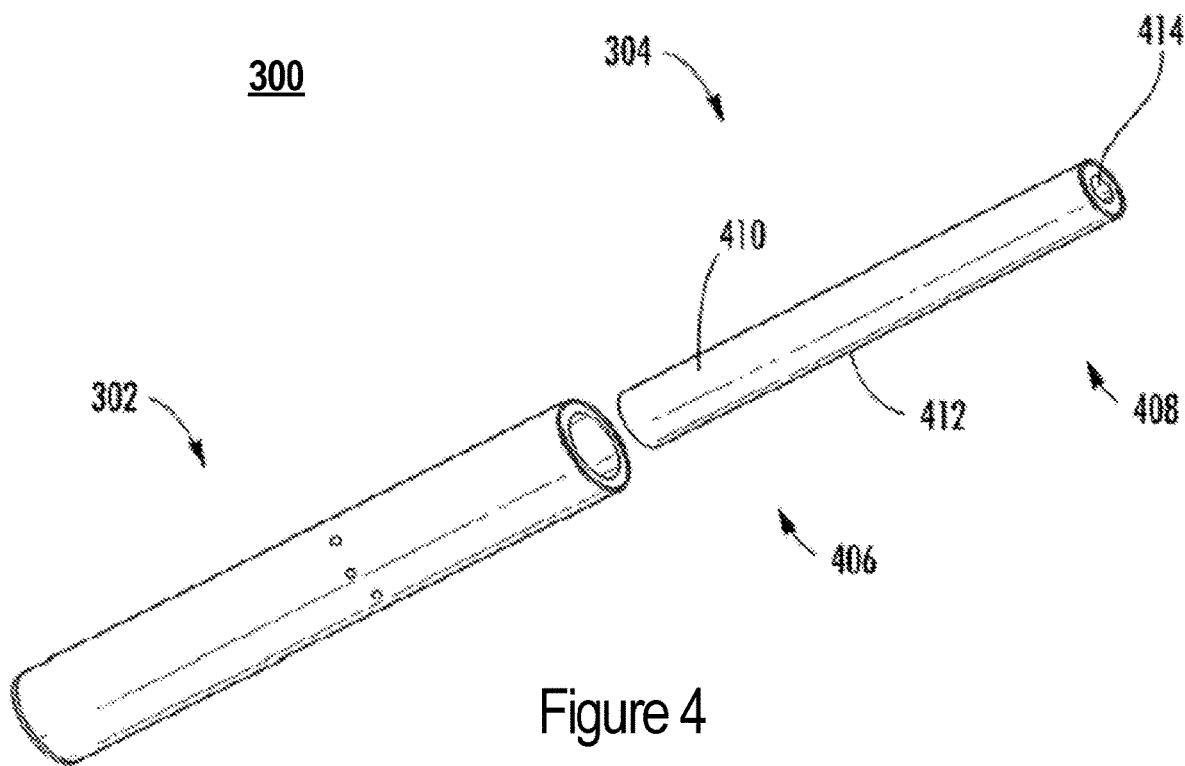
Figure 5:
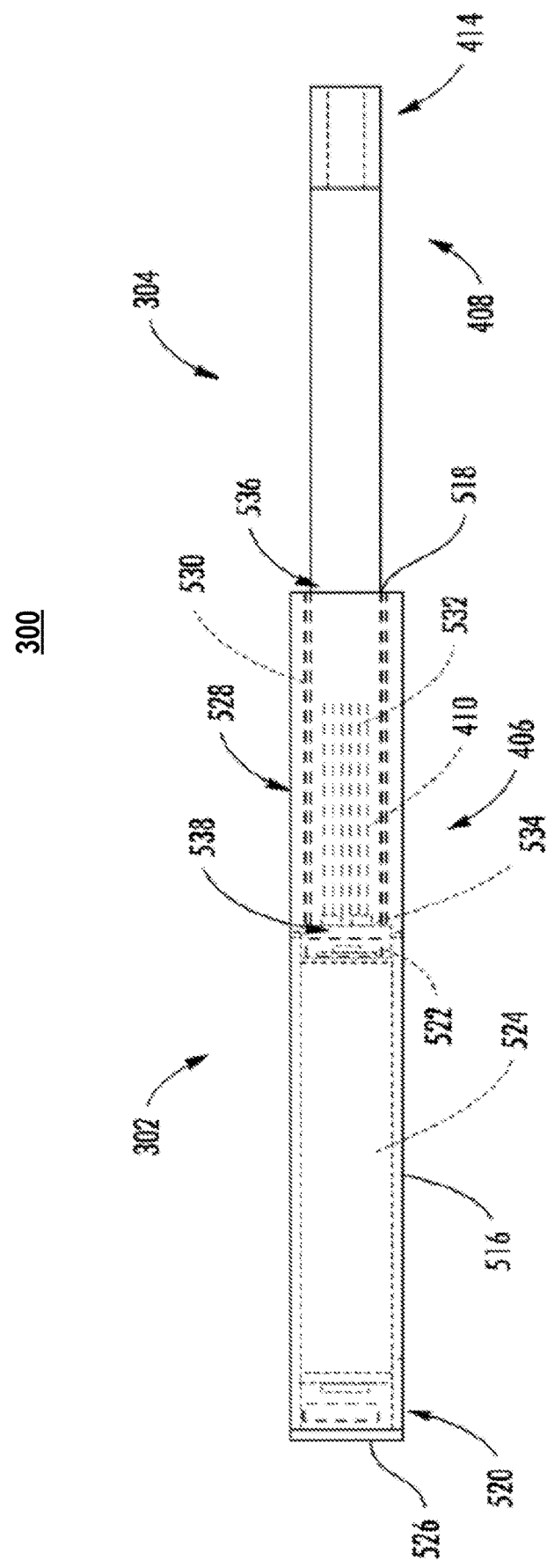
Figure 6:
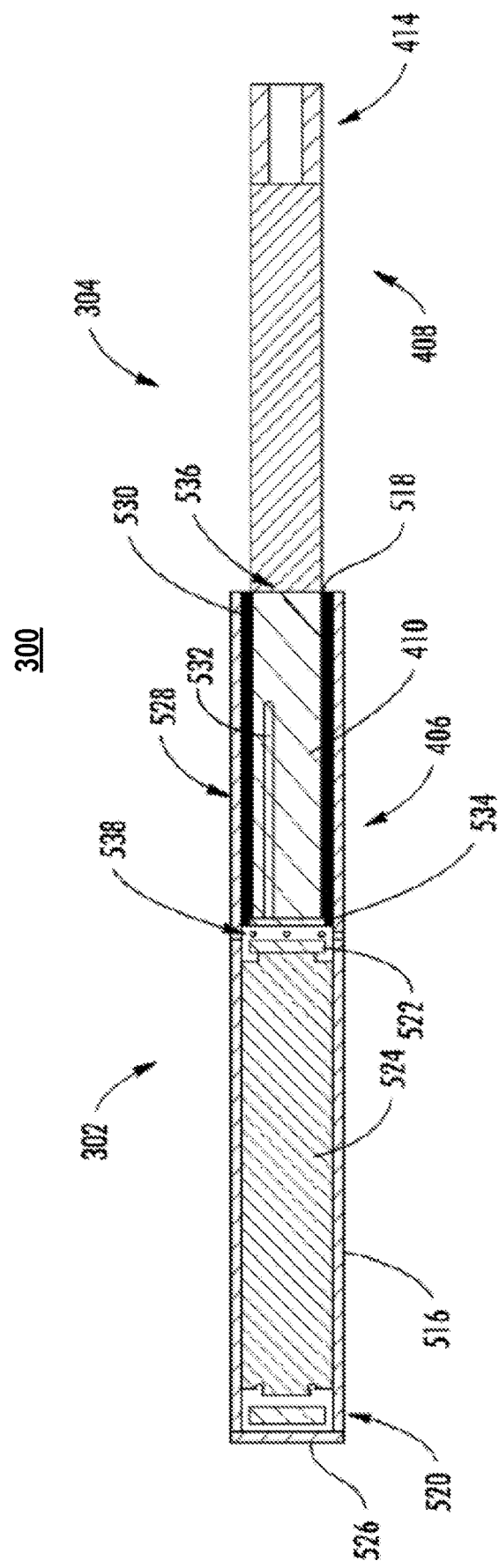
Figure 7:
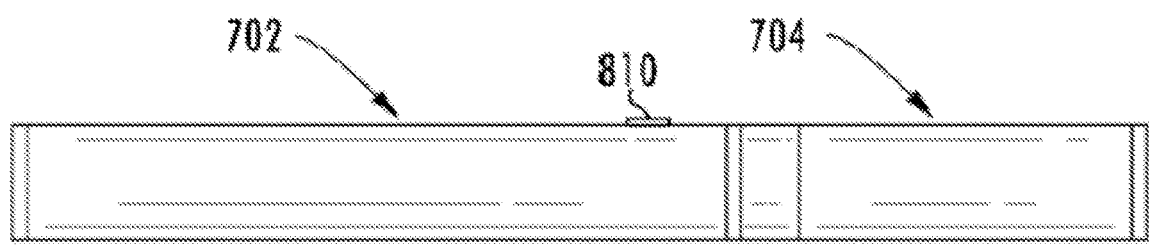
Figure 8:
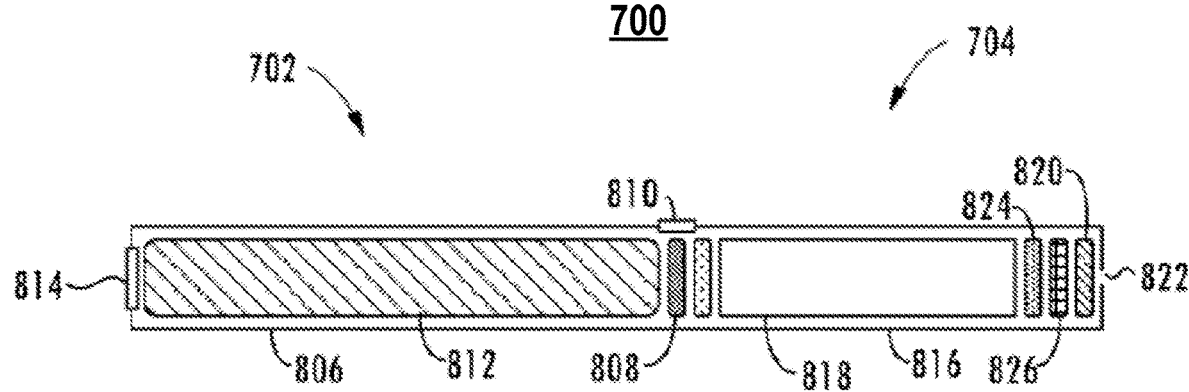
Figure 9:
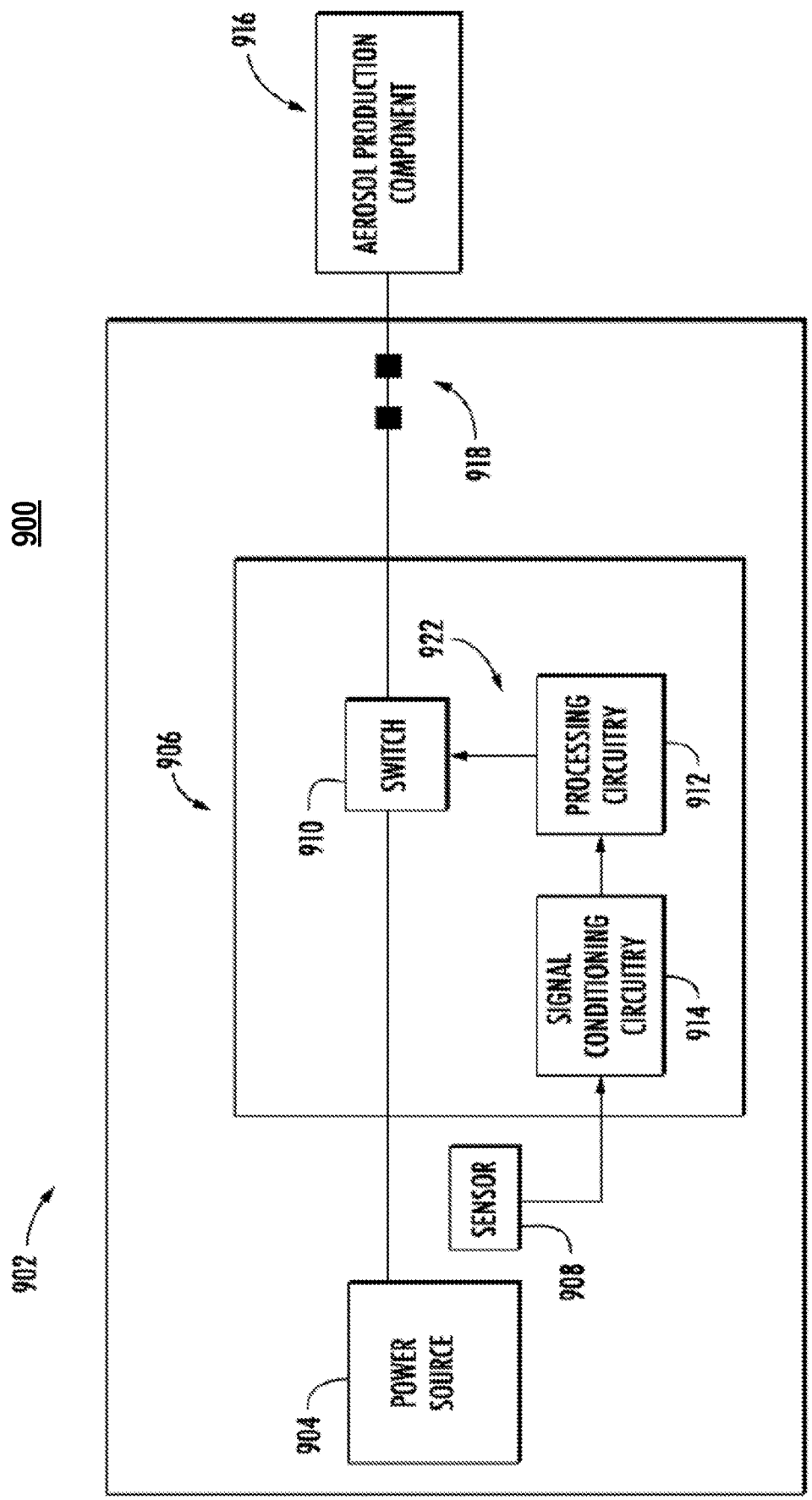
Figure 10:
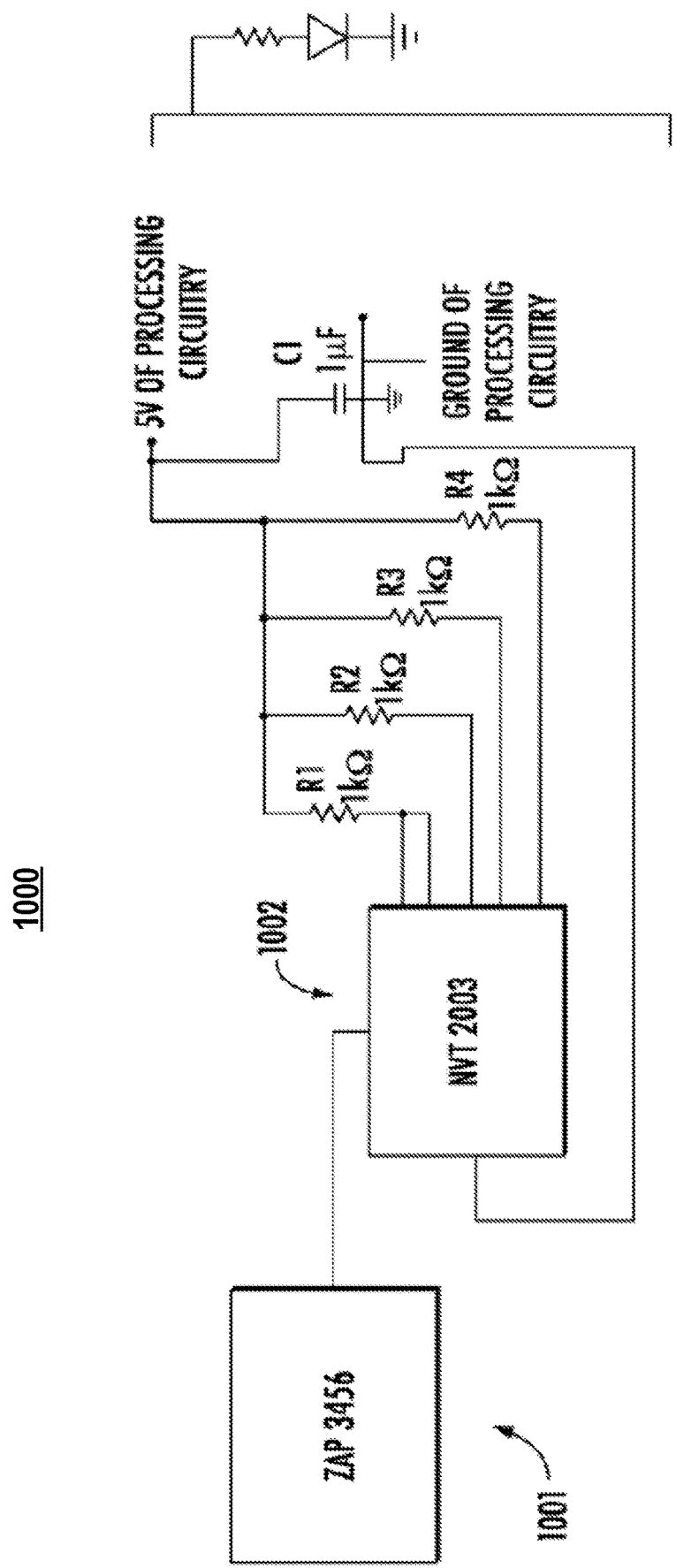

Having thus described aspects of the disclosure in the foregoing general terms, reference will now be made to the accompanying figures, which are not necessarily drawn to scale, and wherein:

FIG. 1 illustrates a perspective view of an aerosol delivery device including a cartridge and a control body that are coupled to one another, according to an example implementation of the present disclosure;

FIG. 2 is a partially cut-away view of the aerosol delivery device of FIG. 1 in which the cartridge and control body are decoupled from one another, according to an example implementation;

FIGS. 3 and 4 illustrate a perspective view of an aerosol delivery device comprising a control body and an aerosol source member that are respectively coupled to one another and decoupled from one another, according to another example implementation of the present disclosure;

FIGS. 5 and 6 illustrate respectively a front view of and a sectional view through the aerosol delivery device of FIGS. 3 and 4, according to an example implementation;

FIGS. 7 and 8 illustrate respectively a side view and a partially cut-away view of an aerosol delivery device including a cartridge coupled to a control body, according to example implementations;

FIG. 9 illustrates a circuit diagram of an aerosol delivery device according to various example implementations of the present disclosure; and FIG. 10 illustrates a circuit diagram of signal conditioning circuitry according to an example implementation of the present disclosure.

Figure 11:
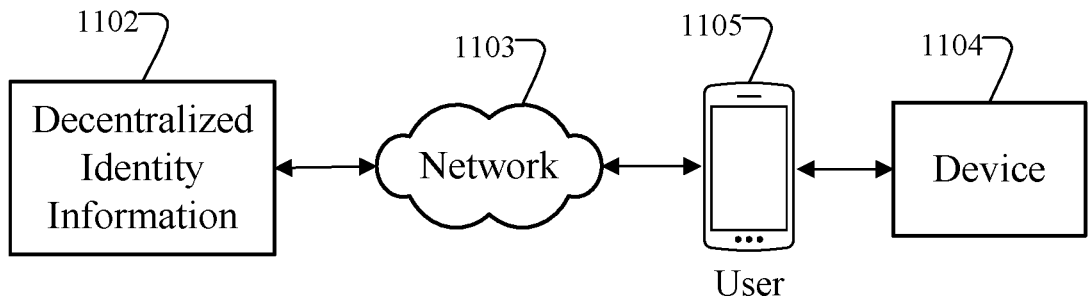

FIG. 11 illustrates an embodiment of a decentralized identity management system.

Figure 12:
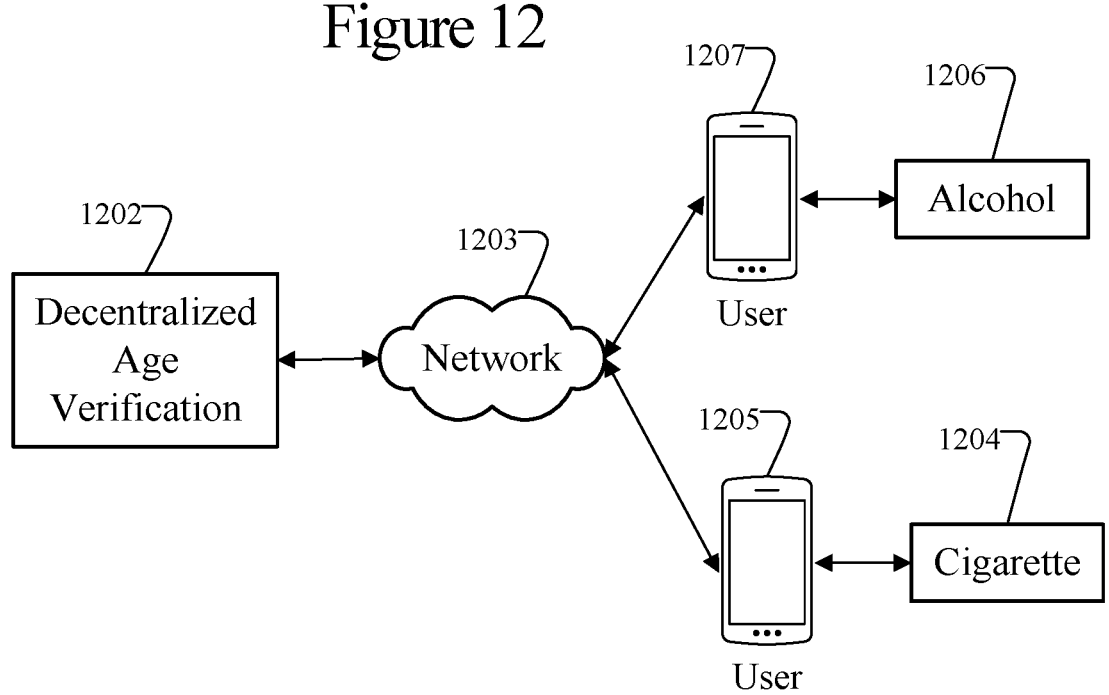

FIG. 12 illustrates another embodiment of a decentralized identity management system.

Figure 13:
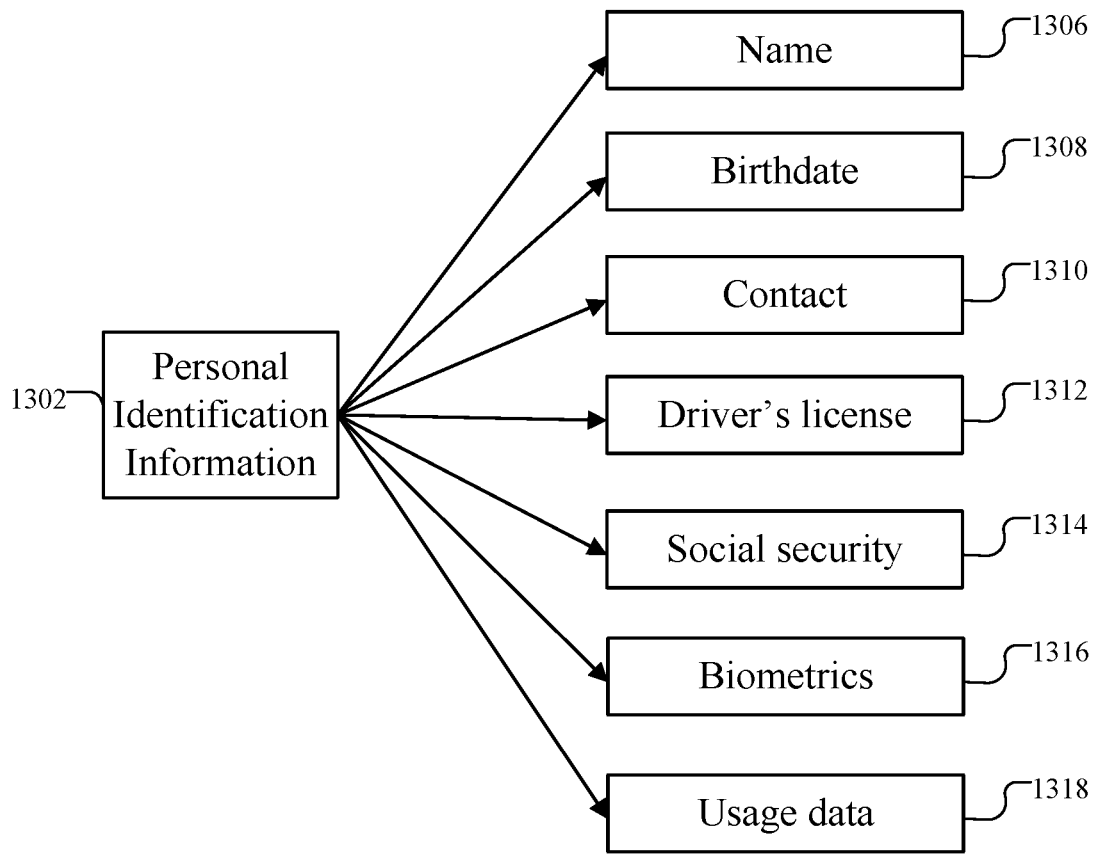

FIG. 13 illustrates an example of personal identification information.

Figure 14:
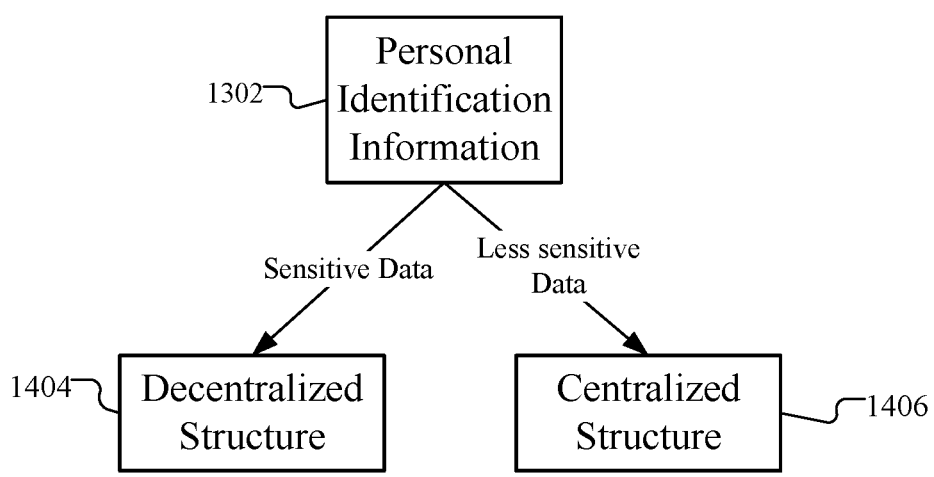

FIG. 14 illustrates an example storage structure for personal identification information.

Figure 15:
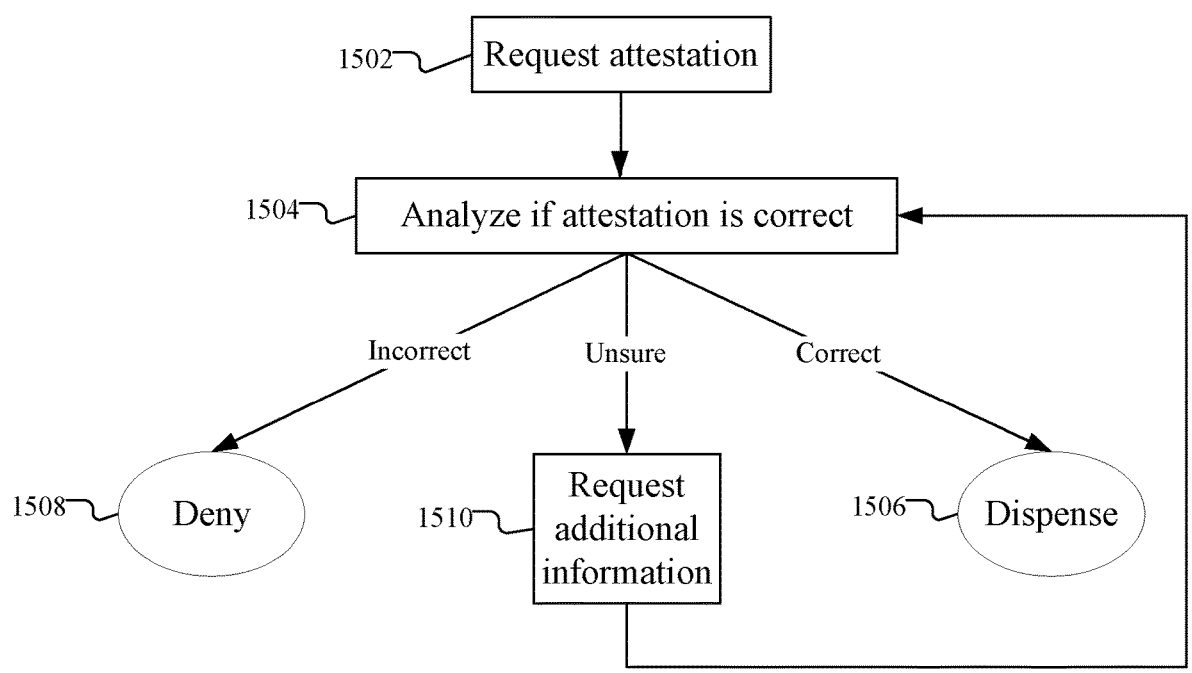

FIG. 15 is a flow chart illustrating an example purchase process.

Figure 16:
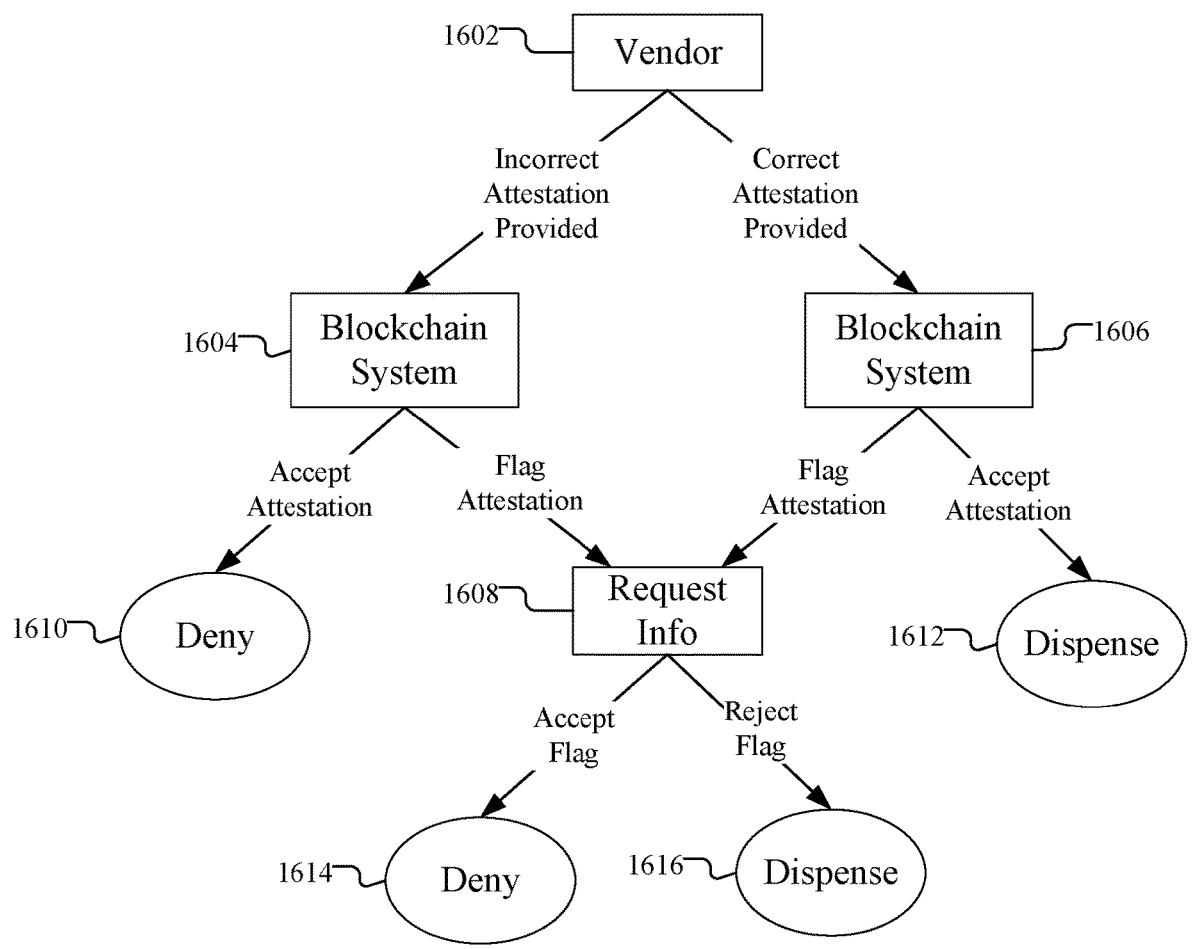

FIG. 16 is a flow chart illustrating another example of a purchase process.

Figure 17:
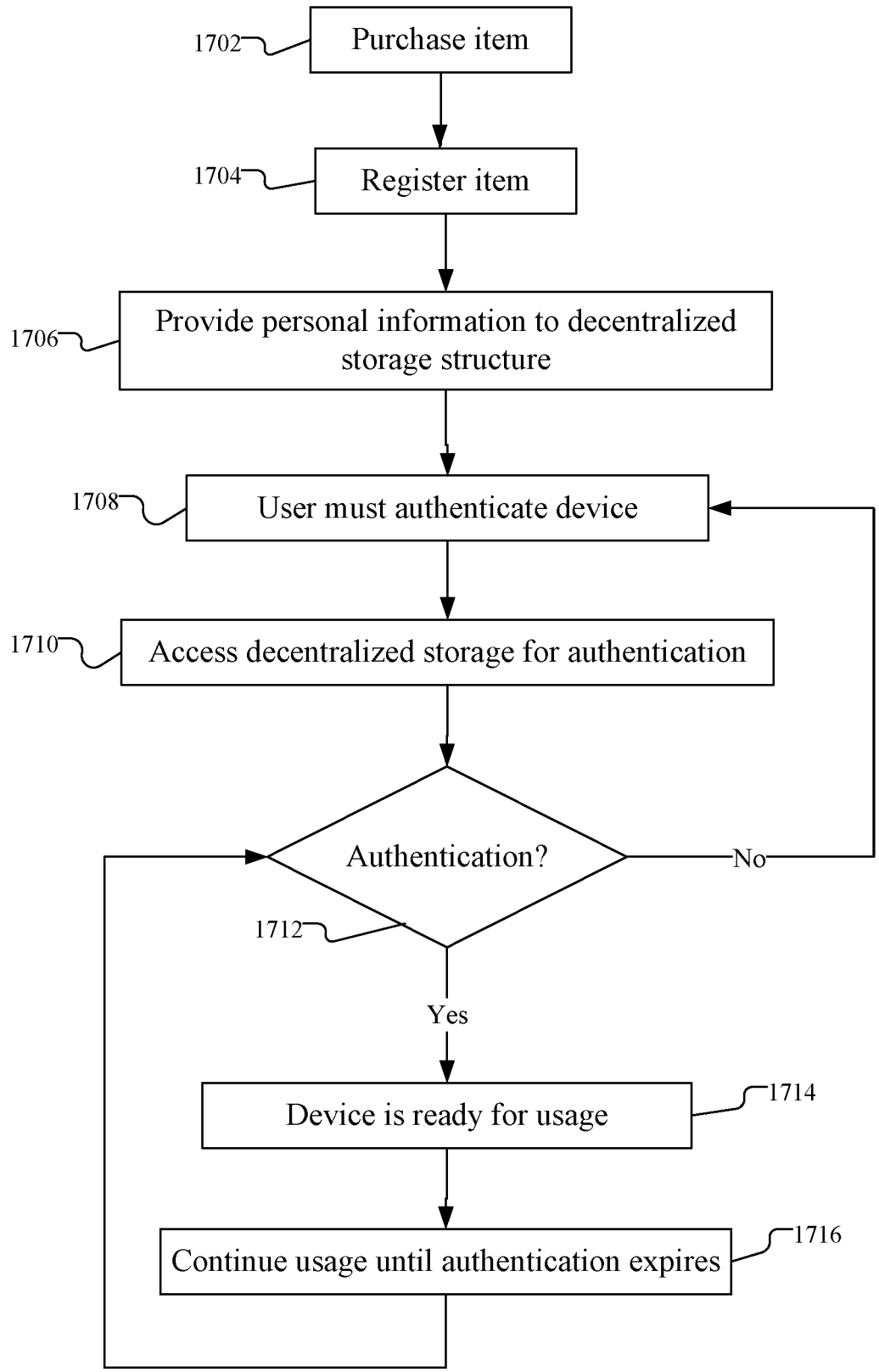

FIG. 17 is a flow chart illustrating a process for utilizing a decentralized identity management system.

Figure 18:
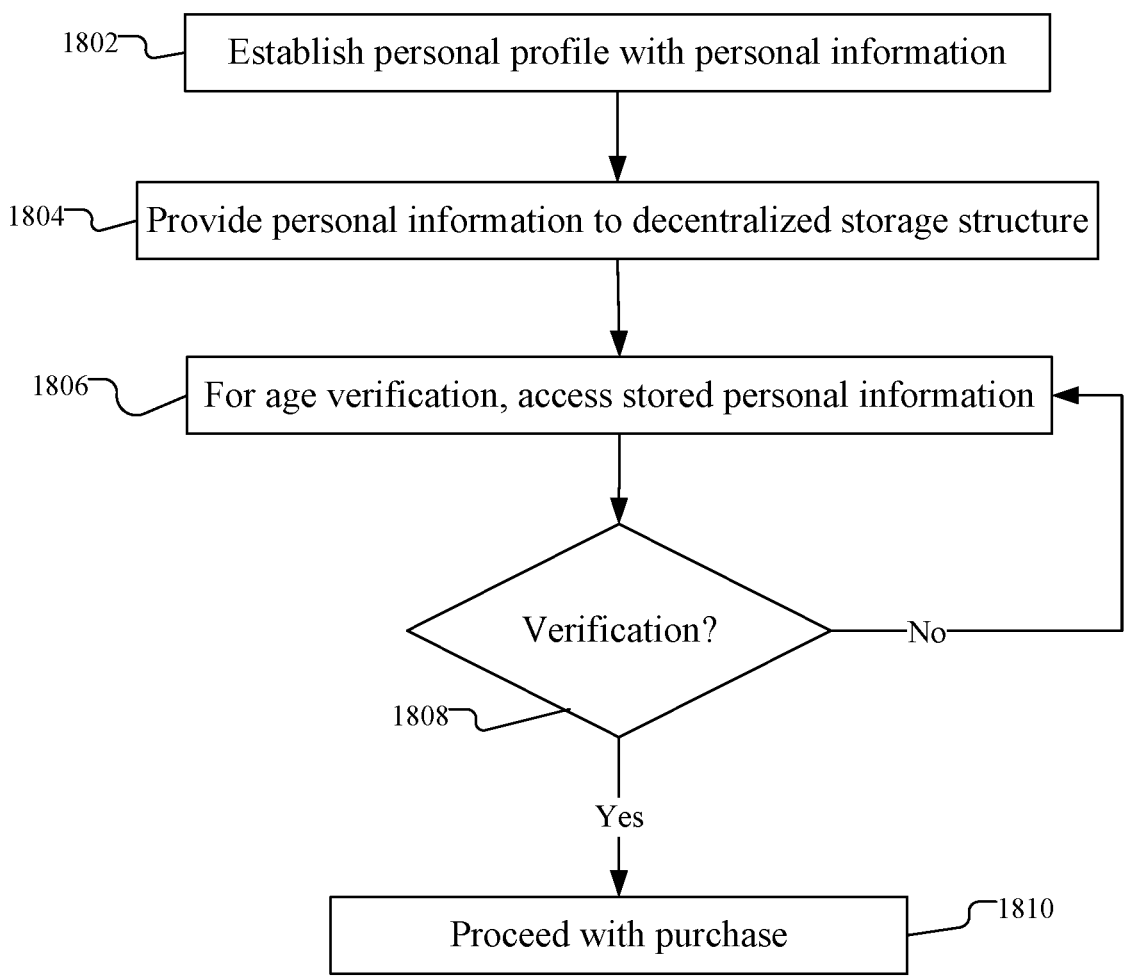

FIG. 18 is a flow chart illustrating a process for age verification with a decentralized identity management system.

Figure 19:
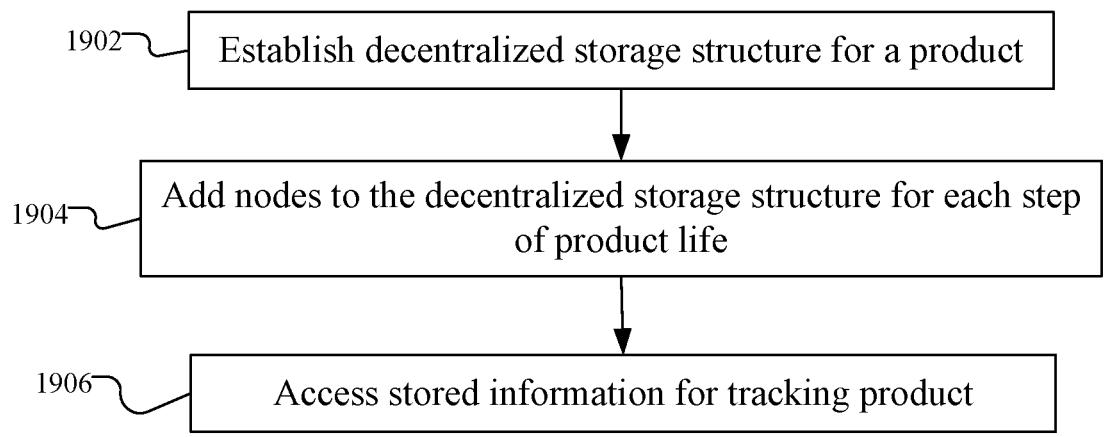

FIG. 19 is a flow chart illustrating a tracking example with a decentralized identity management system.

Figure 20:
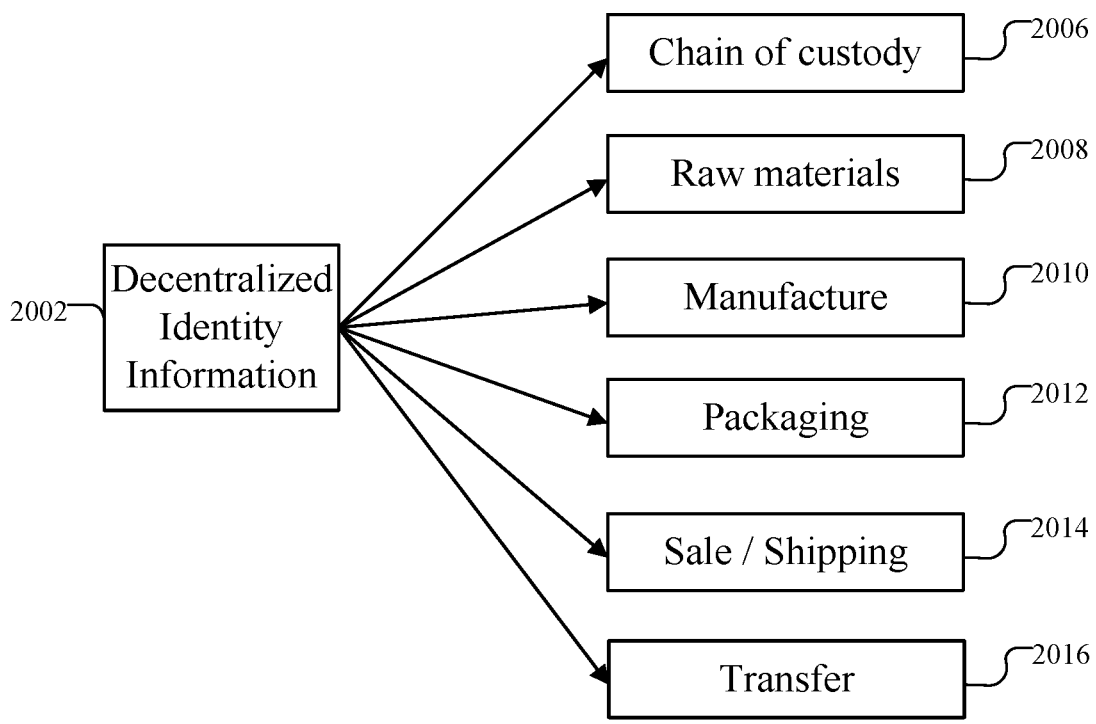

FIG. 20 illustrates example information from a decentralized identity management system.

Figure 21:
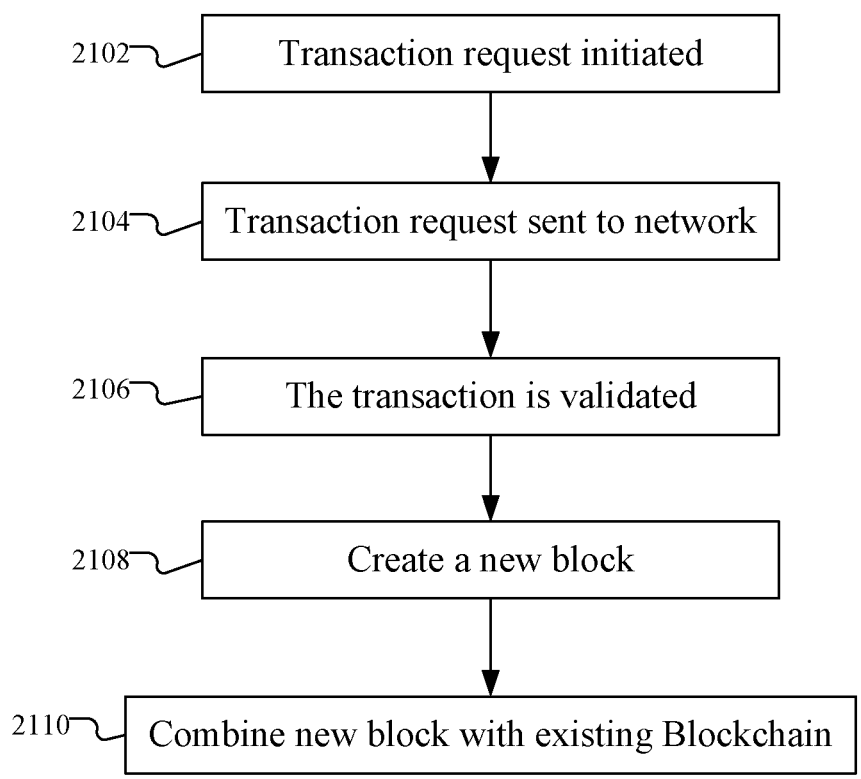

FIG. 21 is a flow chart illustrating transaction data in a decentralized identity management system.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, the present disclosure relates to using a decentralized identity management structure, such as Blockchain, for storing certain information. A decentralized identity management structure may allow for the secure storage of personal information, while also providing necessary access to that information (e.g. for verifying a user's identity or age). The personal or identifying information may be required for certain restricted products, such as requiring age verification for an age-restricted product. One example where age verification is needed is for an electronic nicotine delivery systems ("ENDS") device, which may include aerosol delivery devices. ENDS is one example of such a device that may be associated with a restriction, such as an age restriction, or that may require certain identify information. Other examples include delivery devices for Tetrahydrocannabinol (THC), Cannabidiol (CBD), botanicals, medicinals, and/or other active ingredients. Thus, it will be appreciated that while an ENDS device, such as an aerosol delivery device, is used as an example application of various embodiments throughout, this example is intended to be non-limiting such that inventive concepts disclosed herein can be used with devices other than ENDS devices, including aerosol delivery devices that may be used to deliver other medicinal and/or active ingredients to a user or may include smokeless tobacco or other tobacco products.

The ENDS or aerosol delivery devices may require functionality for authentication, which may be based on age verification. Such devices may be restricted based on age or other factors that require some form of authentication, verification, and/or identification. Using a decentralized management structure for storing identity or age information may provide for secure storage and allow that information to be accessed and provided for authentication or verification for the purchase and/or usage of restricted products, such as an ENDS device.

Aerosol delivery devices are one example of a device that may be restricted and require authentication/verification using identity information that is stored in a decentralized management structure, such as with Blockchain technology. Aerosol delivery devices are further described with respect to FIGS. 1-10. They may be configured to produce an aerosol (an inhalable substance) from an aerosol precursor composition (sometimes referred to as an inhalable substance medium). The aerosol precursor composition may comprise one or more of a solid tobacco material, a semi-solid tobacco material, or a liquid aerosol precursor composition. In some implementations, the aerosol delivery devices may be configured to heat and produce an aerosol from a fluid aerosol precursor composition (e.g., a liquid aerosol precursor composition). Additionally or alternatively, the aerosol precursor composition may comprise one or more substances mentioned above, including but not limited to botanical substances, medicinal substances, alcohol, glycerin, and may include nicotine, Tetrahydrocannabinol (THC), Cannabidiol (CBD), or other active ingredients. Such aerosol delivery devices may include so-called electronic cigarettes. In other implementations, the aerosol delivery devices may comprise heat-not-burn devices. In yet other implementations, the aerosol delivery devices may comprise no-heat-no-burn devices.

Liquid aerosol precursor composition, also referred to as a vapor precursor composition or "e-liquid," is particularly useful for electronic cigarettes and no-heat-no-burn devices. Liquid aerosol precursor composition may comprise a variety of components including, by way of example, a polyhydric alcohol (e.g., glycerin, propylene glycol, or a mixture thereof), nicotine, tobacco, tobacco extract, and/or flavorants. In some examples, the aerosol precursor composition comprises glycerin and nicotine. In other examples, the composition may additionally or alternatively include alcohol, other botanical substances, other medicinal substances, or may include Tetrahydrocannabinol (THC), Cannabidiol (CBD), or other active ingredients, or some combination thereof.

Some liquid aerosol precursor compositions that may be used in conjunction with various implementations may include one or more acids such as levulinic acid, succinic acid, lactic acid, pyruvic acid, benzoic acid, fumaric acid, combinations thereof, and the like. Inclusion of an acid(s) in liquid aerosol precursor compositions including nicotine may provide a protonated liquid aerosol precursor composition, including nicotine in salt form. Representative types of liquid aerosol precursor components and formulations are set forth and characterized in U.S. Pat. No. 7,726,320 to Robinson et al.; U.S. Pat. No. 9,254,002 to Chong et al.; and U.S. Pat. App. Pub. Nos. 2013/0008457 to Zheng et al., 2015/0020823 to Lipowicz et al., and 2015/0020830 to Koller; as well as PCT Pat. App. Pub. No. WO 2014/182736 to Bowen et al.; and U.S. Pat. No. 8,881,737 to Collett et al., the disclosures of which are incorporated herein by reference. Other aerosol precursors that may be employed include the aerosol precursors that have been incorporated in any of a number of the representative products identified above. Also desirable are the so-called "smoke juices" for electronic cigarettes that have been available from Johnson Creek Enterprises LLC. Still further example aerosol precursor compositions are sold under the brand names BLACK NOTE, COSMIC FOG, THE MILKMAN E-LIQUID, FIVE PAWNS, THE VAPOR CHEF, VAPE WILD, BOOSTED, THE STEAM FACTORY, MECH SAUCE, CASEY JONES MAINLINE RESERVE, MITTEN VAPORS, DR. CRIMMY'S V-LIQUID, SMILEY E LIQUID, BEANTOWN VAPOR, CUTTWOOD, CYCLOPS VAPOR, SICBOY, GOOD LIFE VAPOR, TELEOS, PINUP VAPORS, SPACE JAM, MT. BAKER VAPOR, and JIMMY THE JUICE MAN. Implementations of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; U.S. Pat. No. 7,381,667 to Bergquist et al.; U.S. Pat. No. 8,424,541 to Crawford et al.; U.S. Pat. No. 8,627,828 to Strickland et al.; and U.S. Pat. No. 9,307,787 to Sun et al.; as well as U.S. Pat. App. Pub. Nos. 2010/0018539 to Brinkley et al., and PCT Pat. App. Pub. No. WO 97/06786 to Johnson et al., all of which are incorporated by reference herein.

Representative types of substrates, reservoirs or other components for supporting the aerosol precursor are described in U.S. Pat. No. 8,528,569 to Newton; U.S. Pat. App. Pub. No. 2014/0261487 to Chapman et al.; U.S. Pat. App. Pub. No. 2015/0059780 to Davis et al.; and U.S. Pat. App. Pub. No. 2015/0216232 to Bless et al., all of which are incorporated herein by reference. Additionally, various wicking materials, and the configuration and operation of those wicking materials within certain types of electronic cigarettes, are set forth in U.S. Pat. No. 8,910,640 to Sears et al., which is incorporated herein by reference.

In other implementations, the aerosol delivery devices may comprise heat-not-burn devices, configured to heat a solid aerosol precursor composition (e.g., an extruded tobacco rod) or a semi-solid aerosol precursor composition (e.g., a glycerin-loaded tobacco paste). The aerosol precursor composition may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. Representative types of solid and semi-solid aerosol precursor compositions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. Pat. App. Pub. No. 2017/0000188 to Nordskog et al., all of which are incorporated by reference herein. Further representative types of solid and semi-solid aerosol precursor compositions and arrangements include those found in the NEOSTIKS™ consumable aerosol source members for the GLO™ product by British American Tobacco and in the HEETS™ consumable aerosol source members for the IQOS™ product by Philip Morris International, Inc.

In various implementations, the inhalable substance specifically may be a tobacco component or a tobacco-derived material (i.e., a material that is found naturally in tobacco that may be isolated directly from the tobacco or synthetically prepared). For example, the aerosol precursor composition may comprise tobacco extracts or fractions thereof combined with an inert substrate. The aerosol precursor composition may further comprise unburned tobacco or a composition containing unburned tobacco that, when heated to a temperature below its combustion temperature, releases an inhalable substance. In some implementations, the aerosol precursor composition may comprise tobacco condensates or fractions thereof (i.e., condensed components of the smoke produced by the combustion of tobacco, leaving flavors and, possibly, nicotine).

In other implementations, smokeless tobacco and other tobacco products may be examples of an age-restricted product rather than an ENDS device. Representative smokeless tobacco products that have been marketed may include those referred to as CAMEL Snus, CAMEL Orbs, CAMEL Strips, and CAMEL Sticks by R. J. Reynolds Tobacco Company; GRIZZLY moist tobacco, KODIAK moist tobacco, LEVI GARRETT loose tobacco and TAYLOR'S PRIDE loose tobacco by American Snuff Company, LLC; KAYAK moist snuff and CHATTANOOGA CHEW chewing tobacco by Swisher International, Inc.; REDMAN chewing tobacco by Pinkerton Tobacco Co. LP; COPENHAGEN moist tobacco, COPENHAGEN Pouches, SKOAL Bandits, SKOAL Pouches, RED SEAL long cut and REVEL Mint Tobacco Packs by U.S. Smokeless Tobacco Company; and MARLBORO Snus and Taboka by Philip Morris USA. Representative types of snuff products, commonly referred to as "snus," may be manufactured in Europe, particularly in Sweden, by or through companies such as Swedish Match AB, Fiedler & Lundgren AB, Gustavus AB, Skandinavisk Tobakskompagni A/S and Rocker Production AB. Snus products previously or currently available in the U.S.A. have been marketed under the trade names such as CAMEL Snus Frost, CAMEL Snus Original, and CAMEL Snus Spice, CAMEL Snus Mint, CAMEL Snus Mellow, CAMEL Snus Winterchill, and CAMEL Snus Robust by R. J. Reynolds Tobacco Company. Smokeless tobacco products have been packaged in tins, "pucks" or "pots." Other example products include nicotine lozenges, such as REVEL nicotine lozenges (R.J. Reynolds Vapor Company product), and tobacco-free nicotine pouched products, such as ZYN by Swedish Match and LYFT.

Tobacco materials useful in the present disclosure can vary and may include, for example, flue-cured tobacco, burley tobacco, Oriental tobacco or Maryland tobacco, dark tobacco, dark-fired tobacco and *Rustica* tobaccos, as well as other rare or specialty tobaccos, or blends thereof. Tobacco materials also can include so-called "blended" forms and processed forms, such as processed tobacco stems (e.g., cut-rolled or cut-puffed stems), volume expanded tobacco (e.g., puffed tobacco, such as dry ice expanded tobacco (DIET), preferably in cut filler form), reconstituted tobaccos (e.g., reconstituted tobaccos manufactured using paper-making type or cast sheet type processes). Various representative tobacco types, processed types of tobaccos, and types of tobacco blends are set forth in U.S. Pat. No. 4,836,224 to Lawson et al., U.S. Pat. No. 4,924,888 to Perfetti et al., U.S. Pat. No. 5,056,537 to Brown et al., U.S. Pat. No. 5,159,942 to Brinkley et al., U.S. Pat. No. 5,220,930 to Gentry, U.S. Pat. No. 5,360,023 to Blakley et al., U.S. Pat. No. 6,701,936 to Shafer et al., U.S. Pat. No. 7,011,096 to Li et al., U.S. Pat. No. 7,017,585 to Li et al., and U.S. Pat. No. 7,025,066 to Lawson et al.; U.S. Pat. App. Pub. No. 2004/0255965 to Perfetti et al.; PCT Pat. App. Pub. No. WO 02/37990 to Bereman; and Bombick et al., Fund. Appl. Toxicol., 39, p. 11-17 (1997), which are incorporated herein by reference. Further example tobacco compositions that may be useful in a smoking device, including according to the present disclosure, are disclosed in U.S. Pat. No. 7,726,320 to Robinson et al., which is incorporated herein by reference.

Still further, the aerosol precursor composition may comprise an inert substrate having the inhalable substance, or a precursor thereof, integrated therein or otherwise deposited thereon. For example, a liquid comprising the inhalable substance may be coated on or absorbed or adsorbed into the inert substrate such that, upon application of heat, the inhalable substance is released in a form that can be withdrawn from the inventive article through application of positive or negative pressure. In some aspects, the aerosol precursor composition may comprise a blend of flavorful and aromatic tobaccos in cut filler form. In another aspect, the aerosol precursor composition may comprise a reconstituted tobacco material, such as described in U.S. Pat. No. 4,807,809 to Pryor et al.; U.S. Pat. No. 4,889,143 to Pryor et al.; and U.S. Pat. No. 5,025,814 to Raker, the disclosures of which are incorporated herein by reference. For further information regarding suitable aerosol precursor composition, see U.S. patent application Ser. No. 15/916,834 to Sur et al., filed Mar. 9, 2018, which is incorporated herein by reference.

Regardless of the type of aerosol precursor composition, aerosol delivery devices may include an aerosol production component configured to produce an aerosol from the aerosol precursor composition. In the case of an electronic cigarette or a heat-not-burn device, for example, the aerosol production component may be or include a heating element. In the case of a no-heat-no-burn device, in some examples, the aerosol production component may be or include a vibratable piezoelectric or piezomagnetic mesh.

One example of a suitable heating element is an induction heater. Such heaters often comprise an induction transmitter and an induction receiver. The induction transmitter may include a coil configured to create an oscillating magnetic field (e.g., a magnetic field that varies periodically with time) when alternating current is directed through it. The induction receiver may be at least partially located or received within the induction transmitter and may include a conductive material (e.g., ferromagnetic material or an aluminum coated material). By directing alternating current through the induction transmitter, eddy currents may be generated in the induction receiver via induction. The eddy currents flowing through the resistance of the material defining the induction receiver may heat it by Joule heating (i.e., through the Joule effect). The induction receiver, which may define an atomizer, may be wirelessly heated to form an aerosol from an aerosol precursor composition positioned in proximity to the induction receiver. Various implementations of an aerosol delivery device with an induction heater are described in U.S. Pat. App. Pub. No. 2017/0127722 to Davis et al.; U.S. Pat. App. Pub. No. 2017/0202266 to Sur et al.; U.S. patent application Ser. No. 15/352,153 to Sur et al., filed Nov. 15, 2016; U.S. patent application Ser. No. 15/799,365 to Sebastian et al., filed Oct. 31, 2017; and U.S. patent application Ser. No. 15/836,086 to Sur, all of which are incorporated by reference herein.

In other implementations including those described more particularly herein, the heating element is a conductive heater such as in the case of electrical resistance heater. These heaters may be configured to produce heat when an electrical current is directed through it. In various implementations, a conductive heater may be provided in a variety forms, such as in the form of a foil, a foam, discs, spirals, fibers, wires, films, yarns, strips, ribbons or cylinders. Such heaters often include a metal material and are configured to produce heat as a result of the electrical resistance associated with passing an electrical current through it. Such resistive heaters may be positioned in proximity to and heat an aerosol precursor composition to produce an aerosol. A variety of conductive substrates that may be usable with the present disclosure are described in the above-cited U.S. Pat. App. Pub. No. 2013/0255702 to Griffith et al.

In some implementations aerosol delivery devices may include a control body and a cartridge in the case of so-called electronic cigarettes or no-heat-no-burn devices, or a control body and an aerosol source member in the case of heat-not-burn devices. In the case of either electronic cigarettes or heat-not-burn devices, the control body may be reusable, whereas the cartridge/aerosol source member may be configured for a limited number of uses and/or configured to be disposable. Various mechanisms may connect the cartridge/aerosol source member to the control body to result in a threaded engagement, a press-fit engagement, an interference fit, a sliding fit, a magnetic engagement, or the like.

The control body and cartridge/aerosol source member may include separate, respective housings or outer bodies, which may be formed of any of a number of different materials. The housing may be formed of any suitable, structurally-sound material. In some examples, the housing may be formed of a metal or alloy, such as stainless steel, aluminum or the like. Other suitable materials include various plastics (e.g., polycarbonate), metal-plating over plastic, ceramics and the like.

The cartridge (i.e. aerosol source member) may include the aerosol precursor composition. In order to produce aerosol from the aerosol precursor composition, the aerosol production component (e.g., heating element, piezoelectric/piezomagnetic mesh) may be positioned in contact with or proximate the aerosol precursor composition, such as across the control body and cartridge, or in the control body in which the aerosol source member may be positioned. The control body may include a power source, which may be rechargeable or replaceable, and thereby the control body may be reused with multiple cartridges/aerosol source members.

The control body may also include means to activate the aerosol delivery device such as a pushbutton, touch-sensitive surface or the like for manual control of the device. Additionally or alternatively, the control body may include a flow sensor to detect when a user draws on the cartridge/aerosol source member to thereby activate the aerosol delivery device.

In various implementations, the aerosol delivery device according to the present disclosure may have a variety of overall shapes, including, but not limited to an overall shape that may be defined as being substantially rod-like or substantially tubular shaped or substantially cylindrically shaped. In the implementations shown in and described with reference to the accompanying figures, the aerosol delivery device has a substantially round cross-section; however, other cross-sectional shapes (e.g., oval, square, rectangle, triangle, etc.) also are encompassed by the present disclosure. Such language that is descriptive of the physical shape of the article may also be applied to the individual components thereof, including the control body and the cartridge/aerosol source member. In other implementations, the control body may take another handheld shape, such as a small box shape.

In more specific implementations, one or both of the control body and the cartridge/aerosol source member may be referred to as being disposable or as being reusable. For example, the control body may have a power source such as a replaceable battery or a rechargeable battery, SSB, thin-film SSB, rechargeable supercapacitor, lithium-ion or hybrid lithium-ion supercapacitor, or the like. One example of a power source is a TKI-1550 rechargeable lithium-ion battery produced by Tadiran Batteries GmbH of Germany. In another implementation, a useful power source may be a N50-AAA CADNICA nickel-cadmium cell produced by Sanyo Electric Company, Ltd., of Japan. In other implementations, a plurality of such batteries, for example providing 1.2-volts each, may be connected in series. In some implementations, the power source is configured to provide an output voltage. The power source can power the aerosol production component that is powerable to produce an aerosol from an aerosol precursor composition. The power source may be connected with any type of recharging technology, such as a charging accessory as further discussed below.

Examples of power sources are described in U.S. Pat. No. 9,484,155 to Peckerar et al.; and U.S. Pat. App. Pub. No. 2017/0112191 to Sur et al., filed Oct. 21, 2015, the disclosures of which are incorporated herein by reference. Other examples of a suitable power source are provided in U.S. Pat. App. Pub. No. 2014/0283855 to Hawes et al., U.S. Pat. App. Pub. No. 2014/0014125 to Fernando et al., U.S. Pat. App. Pub. No. 2013/0243410 to Nichols et al., U.S. Pat. App. Pub. No. 2010/0313901 to Fernando et al., and U.S. Pat. No. 9,439,454 to Fernando et al., all of which are incorporated herein by reference. With respect to the flow sensor, representative current regulating components and other current controlling components including various microcontrollers, sensors, and switches for aerosol delivery devices are described in U.S. Pat. No. 4,735,217 to Gerth et al.; U.S. Pat. Nos. 4,922,901, 4,947,874, and 4,947,875, all to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al.; U.S. Pat. No. 8,205,622 to Pan; U.S. Pat. No. 8,881,737 to Collet et al.; U.S. Pat. No.

9,423,152 to Ampolini et al.; U.S. Pat. No. 9,439,454 to Fernando et al.; and U.S. Pat. App. Pub. No. 2015/0257445 to Henry et al., all of which are incorporated herein by reference.

Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; PCT Pat. App. Pub. No. WO 2010/091593 to Hon; and PCT Pat. App. Pub. No. WO 2013/089551 to Foo, each of which is incorporated herein by reference. Further, U.S. Pat. App. Pub. No. 2017/0099877 to Worm et al., discloses capsules that may be included in aerosol delivery devices and fob-shape configurations for aerosol delivery devices, and is incorporated herein by reference. A variety of the materials disclosed by the foregoing documents may be incorporated into the present devices in various implementations, and all of the foregoing disclosures are incorporated herein by reference.

Yet other features, controls or components that can be incorporated into aerosol delivery devices of the present disclosure are described in U.S. Pat. No. 5,967,148 to Harris et al.; U.S. Pat. No. 5,934,289 to Watkins et al.; U.S. Pat. No. 5,954,979 to Counts et al.; U.S. Pat. No. 6,040,560 to Fleischhauer et al.; U.S. Pat. No. 8,365,742 to Hon; U.S. Pat. No. 8,402,976 to Fernando et al.; U.S. Pat. App. Pub. No. 2005/0016550 to Katase; U.S. Pat. No. 8,689,804 to Fernando et al.; U.S. Pat. App. Pub. No. 2013/0192623 to Tucker et al.; U.S. Pat. No. 9,427,022 to Leven et al.; U.S. Pat. App. Pub. No. 2013/0180553 to Kim et al.; U.S. Pat. App. Pub. No. 2014/0000638 to Sebastian et al.; U.S. Pat. App. Pub. No. 2014/0261495 to Novak et al.; and U.S. Pat. No. 9,220,302 to DePiano et al., all of which are incorporated herein by reference.

In another aspect, the present disclosure may be directed to kits that provide a variety of components as described herein. For example, a kit may comprise a control body with one or more cartridges or aerosol source members. A kit may further include the charging accessory described below, along with one or more batteries, and a control body with one or more cartridges. A kit may further include the charging accessory described below, and a control body with one or more cartridges. A kit may further include the charging accessory described below, along with one or more batteries. In further embodiments, a kit may comprise a plurality of cartridges. A kit may further comprise a plurality of cartridges and one or more batteries and/or the charging accessory described below. In the above embodiments, the cartridges or the control bodies may be provided with a heating member inclusive thereto. The inventive kits may further include a case (or other packaging, carrying, or storage component) that accommodates one or more of the further kit components. Alternatively, the charging accessory may be a case in one of the kits. The case could be a reusable hard or soft container. Further, the case could be simply a box or other packaging structure.

FIGS. 1 and 2 illustrate implementations of an aerosol delivery device including a control body and a cartridge in the case of an electronic cigarette. In this regard, FIGS. 1 and 2 illustrate an aerosol delivery device 100 according to an example implementation of the present disclosure. As indicated, the aerosol delivery device may include a control body 102 and a cartridge 104. The control body and the cartridge can be permanently or detachably aligned in a functioning relationship. In this regard, FIG. 1 illustrates a perspective view of the aerosol delivery device in a coupled configuration, whereas FIG. 2 illustrates a partially cut-away side view of the aerosol delivery device in a decoupled configuration. The aerosol delivery device may, for example, be substantially rod-like, substantially tubular shaped, or substantially cylindrically shaped in some implementations when the control body and the cartridge are in an assembled configuration.

The control body 102 and the cartridge 104 can be configured to engage one another by a variety of connections, such as a press fit (or interference fit) connection, a threaded connection, a magnetic connection, or the like. As such, the control body may include a first engaging element (e.g., a coupler) that is adapted to engage a second engaging element (e.g., a connector) on the cartridge. The first engaging element and the second engaging element may be reversible. As an example, either of the first engaging element or the second engaging element may be a male thread, and the other may be a female thread. As a further example, either the first engaging element or the second engaging element may be a magnet, and the other may be a metal or a matching magnet. In particular implementations, engaging elements may be defined directly by existing components of the control body and the cartridge. For example, the housing of the control body may define a cavity at an end thereof that is configured to receive at least a portion of the cartridge (e.g., a storage tank or other shell-forming element of the cartridge). In particular, a storage tank of the cartridge may be at least partially received within the cavity of the control body while a mouthpiece of the cartridge remains exposed outside of the cavity of the control body. The cartridge may be retained within the cavity formed by the control body housing, such as by an interference fit (e.g., through use of detents and/or other features creating an interference engagement between an outer surface of the cartridge and an interior surface of a wall forming the control body cavity), by a magnetic engagement (e.g., though use of magnets and/or magnetic metals positioned within the cavity of the control body and positioned on the cartridge), or by other suitable techniques.

As seen in the cut-away view illustrated in FIG. 2, the control body 102 and cartridge 104 each include a number of respective components. The components illustrated in FIG. 2 are representative of the components that may be present in a control body and cartridge and are not intended to limit the scope of components that are encompassed by the present disclosure. As shown, for example, the control body can be formed of a housing 206 (sometimes referred to as a control body shell) that can include a control component 208 (e.g., processing circuitry, etc.), a flow sensor 210, a power source 212 (e.g., battery, supercapacitor), and an indicator 214 (e.g., LED, quantum dot-based LED), and such components can be variably aligned. The power source may be rechargeable, and the control component may include a switch and processing circuitry coupled to the flow sensor and the switch. The processing circuitry may be configured to prevent access (lock) the device depending on the age verification status.

The cartridge 104 can be formed of a housing 216 (sometimes referred to as the cartridge shell) enclosing a reservoir 218 configured to retain the aerosol precursor composition, and including a heating element 220 (aerosol production component). In various configurations, this structure may be referred to as a tank; and accordingly, the terms "cartridge," "tank" and the like may be used interchangeably to refer to a shell or other housing enclosing a reservoir for aerosol precursor composition, and including a heating element.

As shown, in some examples, the reservoir 218 may be in fluid communication with a liquid transport element 222 adapted to wick or otherwise transport an aerosol precursor composition stored in the reservoir housing to the heating element 220. In some examples, a valve may be positioned between the reservoir and heating element, and configured to control an amount of aerosol precursor composition passed or delivered from the reservoir to the heating element.

Various examples of materials configured to produce heat when electrical current is applied therethrough may be employed to form the heating element 220. The heating element in these examples may be a resistive heating element such as a wire coil, micro heater or the like. Example materials from which the heating element may be formed include Kanthal (FeCrAl), nichrome, nickel, stainless steel, indium tin oxide, tungsten, molybdenum disilicide (MoSi2), molybdenum silicide (MoSi), molybdenum disilicide doped with aluminum (Mo(Si,Al)2), titanium, platinum, silver, palladium, alloys of silver and palladium, graphite and graphite-based materials (e.g., carbon-based foams and yarns), conductive inks, boron doped silica, and ceramics (e.g., positive or negative temperature coefficient ceramics). The heating element may be resistive heating element or a heating element configured to generate heat through induction. The heating element may be coated by heat conductive ceramics such as aluminum nitride, silicon carbide, beryllium oxide, alumina, silicon nitride, or their composites. Example implementations of heating elements useful in aerosol delivery devices according to the present disclosure are further described below, and can be incorporated into devices such as those described herein.

An opening 224 may be present in the housing 216 (e.g., at the mouth end) to allow for egress of formed aerosol from the cartridge 104.

The cartridge 104 also may include one or more electronic components 226, which may include an integrated circuit, a memory component (e.g., EEPROM, flash memory), a sensor, or the like. The electronic components may be adapted to communicate with the control component 208 and/or with an external device by wired or wireless means. The electronic components may be positioned anywhere within the cartridge or a base 228 thereof.

Although the control component 208 and the flow sensor 210 are illustrated separately, it is understood that various electronic components including the control component and the flow sensor may be combined on a circuit board (e.g., PCB) that supports and electrically connects the electronic components. Further, the circuit board may be positioned horizontally relative the illustration of FIG. 1 in that the circuit board can be lengthwise parallel to the central axis of the control body. In some examples, the air flow sensor may comprise its own circuit board or other base element to which it can be attached. In some examples, a flexible circuit board may be utilized. A flexible circuit board may be configured into a variety of shapes, include substantially tubular shapes. In some examples, a flexible circuit board may be combined with, layered onto, or form part or all of a heater substrate.

The control body 102 and the cartridge 104 may include components adapted to facilitate a fluid engagement therebetween. As illustrated in FIG. 2, the control body can include a coupler 230 having a cavity 232 therein. The base 228 of the cartridge can be adapted to engage the coupler and can include a projection 234 adapted to fit within the cavity. Such engagement can facilitate a stable connection between the control body and the cartridge as well as establish an electrical connection between the power source 212 and control component 208 in the control body and the heating element 220 in the cartridge. Further, the housing 206 can include an air intake 236, which may be a notch in the housing where it connects to the coupler that allows for passage of ambient air around the coupler and into the housing where it then passes through the cavity 232 of the coupler and into the cartridge through the projection 234.

A coupler and a base useful according to the present disclosure are described in U.S. Pat. App. Pub. No. 2014/0261495 to Novak et al., which is incorporated herein by reference. For example, the coupler 230 as seen in FIG. 2 may define an outer periphery 238 configured to mate with an inner periphery 240 of the base 228. In one example the inner periphery of the base may define a radius that is substantially equal to, or slightly greater than, a radius of the outer periphery of the coupler. Further, the coupler may define one or more protrusions 242 at the outer periphery configured to engage one or more recesses 244 defined at the inner periphery of the base. However, various other examples of structures, shapes and components may be employed to couple the base to the coupler. In some examples the connection between the base of the cartridge 104 and the coupler of the control body 102 may be substantially permanent, whereas in other examples the connection therebetween may be releasable such that, for example, the control body may be reused with one or more additional cartridges that may be disposable and/or refillable.

The reservoir 218 illustrated in FIG. 2 can be a container or can be a fibrous reservoir, as presently described. For example, the reservoir can comprise one or more layers of nonwoven fibers substantially formed into the shape of a tube encircling the interior of the housing 216, in this example. An aerosol precursor composition can be retained in the reservoir. Liquid components, for example, can be sorptively retained by the reservoir. The reservoir can be in fluid connection with the liquid transport element 222. The liquid transport element can transport the aerosol precursor composition stored in the reservoir via capillary action—or via a micro pump—to the heating element 220 that is in the form of a metal wire coil in this example. As such, the heating element is in a heating arrangement with the liquid transport element.

In some examples, a microfluidic chip may be embedded in the reservoir 218, and the amount and/or mass of aerosol precursor composition delivered from the reservoir may be controlled by a micro pump, such as one based on microelectromechanical systems (MEMS) technology. Other example implementations of reservoirs and transport elements useful in aerosol delivery devices according to the present disclosure are further described herein, and such reservoirs and/or transport elements can be incorporated into devices such as those described herein. In particular, specific combinations of heating members and transport elements as further described herein may be incorporated into devices such as those described herein.

In use, when a user draws on the aerosol delivery device 100, airflow is detected by the flow sensor 210, and the heating element 220 is activated to vaporize components of the aerosol precursor composition. Drawing upon the mouth end of the aerosol delivery device causes ambient air to enter the air intake 236 and pass through the cavity 232 in the coupler 230 and the central opening in the projection 234 of the base 228. In the cartridge 104, the drawn air combines with the formed vapor to form an aerosol. The aerosol is whisked, aspirated or otherwise drawn away from the heating element and out the opening 224 in the mouth end of the aerosol delivery device.

For further detail regarding implementations of an aerosol delivery device including a control body and a cartridge in the case of an electronic cigarette, see the above-cited U.S. patent application Ser. No. 15/836,086 to Sur; and U.S. patent application Ser. No. 15/916,834 to Sur et al.; as well as U.S. patent application Ser. No. 15/916,696 to Sur, filed Mar. 9, 2018, which is also incorporated herein by reference.

FIGS. 3-6 illustrate implementations of an aerosol delivery device including a control body and an aerosol source member in the case of a heat-not-burn device. More specifically, FIG. 3 illustrates an aerosol delivery device 300 according to an example implementation of the present disclosure. The aerosol delivery device may include a control body 302 and an aerosol source member 304. In various implementations, the aerosol source member and the control body can be permanently or detachably aligned in a functioning relationship. In this regard, FIG. 3 illustrates the aerosol delivery device in a coupled configuration, whereas FIG. 4 illustrates the aerosol delivery device in a decoupled configuration.

As shown in FIG. 4, in various implementations of the present disclosure, the aerosol source member 304 may comprise a heated end 406, which is configured to be inserted into the control body 302, and a mouth end 408, upon which a user draws to create the aerosol. In various implementations, at least a portion of the heated end may include an aerosol precursor composition 410.

In various implementations, the aerosol source member 304, or a portion thereof, may be wrapped in an exterior overwrap material 412, which may be formed of any material useful for providing additional structure and/or support for the aerosol source member. In various implementations, the exterior overwrap material may comprise a material that resists transfer of heat, which may include a paper or other fibrous material, such as a cellulose material. The exterior overwrap material may also include at least one filler material imbedded or dispersed within the fibrous material. In various implementations, the filler material may have the form of water insoluble particles. Additionally, the filler material may incorporate inorganic components. In various implementations, the exterior overwrap may be formed of multiple layers, such as an underlying, bulk layer and an overlying layer, such as a typical wrapping paper in a cigarette. Such materials may include, for example, lightweight "rag fibers" such as flax, hemp, sisal, rice straw, and/or esparto. The exterior overwrap may also include a material typically used in a filter element of a conventional cigarette, such as cellulose acetate.

Further, an excess length of the overwrap at the mouth end 408 of the aerosol source member may function to simply separate the aerosol precursor composition 410 from the mouth of a consumer or to provide space for positioning of a filter material, as described below, or to affect draw on the article or to affect flow characteristics of the vapor or aerosol leaving the device during draw. Further discussion relating to the configurations for overwrap materials that may be used with the present disclosure may be found in the above-cited U.S. Pat. No. 9,078,473 to Worm et al.

In various implementations other components may exist between the aerosol precursor composition 410 and the mouth end 408 of the aerosol source member 304, wherein the mouth end may include a filter 414, which may, for example, be made of a cellulose acetate or polypropylene material. The filter may additionally or alternatively contain strands of tobacco containing material, such as described in U.S. Pat. No. 5,025,814 to Raker et al., which is incorporated herein by reference in its entirety. In various implementations, the filter may increase the structural integrity of the mouth end of the aerosol source member, and/or provide filtering capacity, if desired, and/or provide resistance to draw. In some implementations one or any combination of the following may be positioned between the aerosol precursor composition and the mouth end: an air gap; phase change materials for cooling air; flavor releasing media; ion exchange fibers capable of selective chemical adsorption; aerogel particles as filter medium; and other suitable materials.

Various implementations of the present disclosure employ one or more conductive heating elements to heat the aerosol precursor composition 410 of the aerosol source member 304. In various implementations, the heating element may be provided in a variety forms, such as in the form of a foil, a foam, a mesh, a hollow ball, a half ball, discs, spirals, fibers, wires, films, yarns, strips, ribbons, or cylinders. Such heating elements often comprise a metal material and are configured to produce heat as a result of the electrical resistance associated with passing an electrical current therethrough. Such resistive heating elements may be positioned in direct contact with, or in proximity to, the aerosol source member and particularly, the aerosol precursor composition of the aerosol source member. The heating element may be located in the control body and/or the aerosol source member. In various implementations, the aerosol precursor composition may include components (i.e., heat conducting constituents) that are imbedded in, or otherwise part of, the substrate portion that may serve as, or facilitate the function of, the heating assembly. Some examples of various heating members and elements are described in U.S. Pat. No. 9,078,473 to Worm et al.

Some non-limiting examples of various heating element configurations include configurations in which a heating element is placed in proximity with the aerosol source member 304. For instance, in some examples, at least a portion of a heating element may surround at least a portion of an aerosol source member. In other examples, one or more heating elements may be positioned adjacent an exterior of an aerosol source member when inserted in the control body 302. In other examples, at least a portion of a heating element may penetrate at least a portion of an aerosol source member (such as, for example, one or more prongs and/or spikes that penetrate an aerosol source member), when the aerosol source member is inserted into the control body. In some instances, the aerosol precursor composition may include a structure in contact with, or a plurality of beads or particles imbedded in, or otherwise part of, the aerosol precursor composition that may serve as, or facilitate the function of the heating element.

FIG. 5 illustrates a front view of an aerosol delivery device 300 according to an example implementation of the present disclosure, and FIG. 6 illustrates a sectional view through the aerosol delivery device of FIG. 5. In particular, the control body 302 of the depicted implementation may comprise a housing 516 that includes an opening 518 defined in an engaging end thereof, a flow sensor 520 (e.g., a puff sensor or pressure switch), a control component 522 (e.g., processing circuitry, etc.), a power source 524 (e.g., battery, supercapacitor), and an end cap that includes an indicator 526 (e.g., a LED). The power source may be rechargeable, and the control component may include a switch and processing circuitry coupled to the flow sensor and the switch. The processing circuitry may be configured to prevent operation with the switch if the age verification fails as further discussed below.

In one implementation, the indicator 526 may comprise one or more LEDs, quantum dot-based LEDs or the like. The indicator can be in communication with the control component 522 and be illuminated, for example, when a user draws on the aerosol source member 304, when coupled to the control body 302, as detected by the flow sensor 520.

The control body 302 of the depicted implementation includes one or more heating assemblies 528 (individually or collectively referred to a heating assembly) configured to heat the aerosol precursor composition 410 of the aerosol source member 304. Although the heating assembly of various implementations of the present disclosure may take a variety of forms, in the particular implementation depicted in FIGS. 5 and 6, the heating assembly comprises an outer cylinder 530 and a heating element 532 (aerosol production component), which in this implementation comprises a plurality of heater prongs that extend from a receiving base 534 (in various configurations, the heating assembly or more specifically the heater prongs may be referred to as a heater). In the depicted implementation, the outer cylinder comprises a double-walled vacuum tube constructed of stainless steel to maintain heat generated by the heater prongs within the outer cylinder, and more particularly, maintain heat generated by heater prongs within the aerosol precursor composition. In various implementations, the heater prongs may be constructed of one or more conductive materials, including, but not limited to, copper, aluminum, platinum, gold, silver, iron, steel, brass, bronze, graphite, or any combination thereof.

As illustrated, the heating assembly 528 may extend proximate an engagement end of the housing 516, and may be configured to substantially surround a portion of the heated end 406 of the aerosol source member 304 that includes the aerosol precursor composition 410. In such a manner, the heating assembly may define a generally tubular configuration. As illustrated in FIGS. 5 and 6, the heating element 532 (e.g., plurality of heater prongs) is surrounded by the outer cylinder 530 to create a receiving chamber 536. In such a manner, in various implementations the outer cylinder may comprise a nonconductive insulating material and/or construction including, but not limited to, an insulating polymer (e.g., plastic or cellulose), glass, rubber, ceramic, porcelain, a double-walled vacuum structure, or any combinations thereof.

In some implementations, one or more portions or components of the heating assembly 528 may be combined with, packaged with, and/or integral with (e.g., embedded within) the aerosol precursor composition 410. For example, in some implementations the aerosol precursor composition may be formed of a material as described above and may include one or more conductive materials mixed therein. In some of these implementations, contacts may be connected directly to the aerosol precursor composition such that, when the aerosol source member is inserted into the receiving chamber of the control body, the contacts make electrical connection with the electrical energy source. Alternatively, the contacts may be integral with the electrical energy source and may extend into the receiving chamber such that, when the aerosol source member is inserted into the receiving chamber of the control body, the contacts make electrical connection with the aerosol precursor composition. Because of the presence of the conductive material in the aerosol precursor composition, the application of power from the electrical energy source to the aerosol precursor composition allows electrical current to flow and thus produce heat from the conductive material. Thus, in some implementations the heating element may be described as being integral with the aerosol precursor composition. As a non-limiting example, graphite or other suitable, conductive material may be mixed with, embedded in, or otherwise present directly on or within the material forming the aerosol precursor composition to make the heating element integral with the medium.

As noted above, in the illustrated implementation, the outer cylinder 530 may also serve to facilitate proper positioning of the aerosol source member 304 when the aerosol source member is inserted into the housing 516. In various implementations, the outer cylinder of the heating assembly 528 may engage an internal surface of the housing to provide for alignment of the heating assembly with respect to the housing. Thereby, as a result of the fixed coupling between the heating assembly, a longitudinal axis of the heating assembly may extend substantially parallel to a longitudinal axis of the housing. In particular, the support cylinder may extend from the opening 518 of the housing to the receiving base 534 to create the receiving chamber 536.

The heated end 406 of the aerosol source member 304 is sized and shaped for insertion into the control body 302. In various implementations, the receiving chamber 536 of the control body may be characterized as being defined by a wall with an inner surface and an outer surface, the inner surface defining the interior volume of the receiving chamber. For example, in the depicted implementations, the outer cylinder 530 defines an inner surface defining the interior volume of the receiving chamber. In the illustrated implementation, an inner diameter of the outer cylinder may be slightly larger than or approximately equal to an outer diameter of a corresponding aerosol source member (e.g., to create a sliding fit) such that the outer cylinder is configured to guide the aerosol source member into the proper position (e.g., lateral position) with respect to the control body. Thus, the largest outer diameter (or other dimension depending upon the specific cross-sectional shape of the implementations) of the aerosol source member may be sized to be less than the inner diameter (or other dimension) at the inner surface of the wall of the open end of the receiving chamber in the control body. In some implementations, the difference in the respective diameters may be sufficiently small so that the aerosol source member fits snugly into the receiving chamber, and frictional forces prevent the aerosol source member from being moved without an applied force. On the other hand, the difference may be sufficient to allow the aerosol source member to slide into or out of the receiving chamber without requiring undue force.

In the illustrated implementation, the control body 302 is configured such that when the aerosol source member 304 is inserted into the control body, the heating element 532 (e.g., heater prongs) is located in the approximate radial center of at least a portion of the aerosol precursor composition 410 of the heated end 406 of the aerosol source member. In such a manner, when used in conjunction with a solid or semi-solid aerosol precursor composition, the heater prongs may be in direct contact with the aerosol precursor composition. In other implementations, such as when used in conjunction with an extruded aerosol precursor composition that defines a tube structure, the heater prongs may be located inside of a cavity defined by an inner surface of the extruded tube structure, and would not contact the inner surface of the extruded tube structure.

During use, the consumer initiates heating of the heating assembly 528, and in particular, the heating element 532 that is adjacent the aerosol precursor composition 410 (or a specific layer thereof). Heating of the aerosol precursor composition releases the inhalable substance within the aerosol source member 304 so as to yield the inhalable substance. When the consumer inhales on the mouth end 408 of the aerosol source member, air is drawn into the aerosol source member through an air intake 538 such as openings or apertures in the control body 302. The combination of the drawn air and the released inhalable substance is inhaled by the consumer as the drawn materials exit the mouth end of the aerosol source member. In some implementations, to initiate heating, the consumer may manually actuate a push-button or similar component that causes the heating element of the heating assembly to receive electrical energy from the battery or other energy source. The electrical energy may be supplied for a pre-determined length of time or may be manually controlled.

In some implementations, flow of electrical energy does not substantially proceed in between puffs on the device 300 (although energy flow may proceed to maintain a baseline temperature greater than ambient temperature—e.g., a temperature that facilitates rapid heating to the active heating temperature). In the depicted implementation, however, heating is initiated by the puffing action of the consumer through use of one or more sensors, such as flow sensor 520. Once the puff is discontinued, heating will stop or be reduced. When the consumer has taken a sufficient number of puffs so as to have released a sufficient amount of the inhalable substance (e.g., an amount sufficient to equate to a typical smoking experience), the aerosol source member 304 may be removed from the control body 302 and discarded. In some implementations, further sensing elements, such as capacitive sensing elements and other sensors, may be used as discussed in U.S. patent application Ser. No. 15/707,461 to Phillips et al., which is incorporated herein by reference.

In various implementations, the aerosol source member 304 may be formed of any material suitable for forming and maintaining an appropriate conformation, such as a tubular shape, and for retaining therein the aerosol precursor composition 410. In some implementations, the aerosol source member may be formed of a single wall or, in other implementations, multiple walls, and may be formed of a material (natural or synthetic) that is heat resistant so as to retain its structural integrity—e.g., does not degrade—at least at a temperature that is the heating temperature provided by the electrical heating element, as further discussed herein. While in some implementations, a heat resistant polymer may be used, in other implementations, the aerosol source member may be formed from paper, such as a paper that is substantially straw-shaped. As further discussed herein, the aerosol source member may have one or more layers associated therewith that function to substantially prevent movement of vapor therethrough. In one example implementation, an aluminum foil layer may be laminated to one surface of the aerosol source member. Ceramic materials also may be used. In further implementations, an insulating material may be used so as not to unnecessarily move heat away from the aerosol precursor composition. Further example types of components and materials that may be used to provide the functions described above or be used as alternatives to the materials and components noted above can be those of the types set forth in U.S. Pat. App. Pub. Nos. 2010/00186757 to Crooks et al., 2010/00186757 to Crooks et al., and 2011/0041861 to Sebastian et al., all of which are incorporated herein by reference.

In the depicted implementation, the control body 302 includes a control component 522 that controls the various functions of the aerosol delivery device 300, including providing power to the electrical heating element 532. For example, the control component may include processing circuitry (which may be connected to further components, as further described herein) that is connected by electrically conductive wires (not shown) to the power source 524. In various implementations, the processing circuitry may control when and how the heating assembly 528, and particularly the heater prongs, receives electrical energy to heat the aerosol precursor composition 410 for release of the inhalable substance for inhalation by a consumer. In some implementations, such control may be activated by a flow sensor 520 as described in greater detail above.

As seen in FIGS. 5 and 6, the heating assembly 528 of the depicted implementation comprises an outer cylinder 530 and a heating element 532 (e.g., plurality of heater prongs) that extend from a receiving base 534. In some implementations, such as those wherein the aerosol precursor composition 410 comprises a tube structure, the heater prongs may be configured to extend into a cavity defined by the inner surface of the aerosol precursor composition. In other implementations, such as the depicted implementation wherein the aerosol precursor composition comprises a solid or semi-solid, the plurality of heater prongs are configured to penetrate into the aerosol precursor composition contained in the heated end 406 of the aerosol source member 304 when the aerosol source member is inserted into the control body 302. In such implementations, one or more of the components of the heating assembly, including the heater prongs and/or the receiving base, may be constructed of a non-stick or stick-resistant material, for example, certain aluminum, copper, stainless steel, carbon steel, and ceramic materials. In other implementations, one or more of the components of the heating assembly, including the heater prongs and/or the receiving base, may include a non-stick coating, including, for example, a polytetrafluoroethylene (PTFE) coating, such as Teflon®, or other coatings, such as a stick-resistant enamel coating, or a ceramic coating, such as Greblon®, or Thermolon™, or a ceramic coating, such as Greblon®, or Thermolon™.

In addition, although in the depicted implementation there are multiple heater prongs 532 that are substantially equally distributed about the receiving base 534, it should be noted that in other implementations, any number of heater prongs may be used, including as few as one, with any other suitable spatial configuration. Furthermore, in various implementations the length of the heater prongs may vary. For example, in some implementations the heater prongs may comprise small projections, while in other implementations the heater prongs may extend any portion of the length of the receiving chamber 536, including up to about 25%, up to about 50%, up to about 75%, and up to about the full length of the receiving chamber. In still other implementations, the heating assembly 528 may take on other configurations. Examples of other heater configurations that may be adapted for use in the present invention per the discussion provided above can be found in U.S. Pat. No. 5,060,671 to Counts et al., U.S. Pat. No. 5,093,894 to Deevi et al., U.S. Pat. No. 5,224,498 to Deevi et al., U.S. Pat. No. 5,228,460 to Sprinkel Jr., et al., U.S. Pat. No. 5,322,075 to Deevi et al., U.S. Pat. No. 5,353,813 to Deevi et al., U.S. Pat. No. 5,468,936 to Deevi et al., U.S. Pat. No. 5,498,850 to Das, U.S. Pat. No. 5,659,656 to Das, U.S. Pat. No. 5,498,855 to Deevi et al., U.S. Pat. No. 5,530,225 to Hajaligol, U.S. Pat. No. 5,665,262 to Hajaligol, and U.S. Pat. No. 5,573,692 to Das et al.; and U.S. Pat. No. 5,591,368 to Fleischhauer et al., which are incorporated herein by reference.

In various implementations, the control body 302 may include an air intake 538 (e.g., one or more openings or apertures) therein for allowing entrance of ambient air into the interior of the receiving chamber 536. In such a manner, in some implementations the receiving base 534 may also include an air intake. Thus, in some implementations when a consumer draws on the mouth end of the aerosol source member 304, air can be drawn through the air intake of the control body and the receiving base into the receiving chamber, pass into the aerosol source member, and be drawn through the aerosol precursor composition 410 of the aerosol source member for inhalation by the consumer. In some implementations, the drawn air carries the inhalable substance through the optional filter 414 and out of an opening at the mouth end 408 of the aerosol source member. With the heating element 532 positioned inside the aerosol precursor composition, the heater prongs may be activated to heat the aerosol precursor composition and cause release of the inhalable substance through the aerosol source member.

As described above with reference to FIGS. 5 and 6 in particular, various implementations of the present disclosure employ a conductive heater to heat the aerosol precursor composition 410. As also indicated above, various other implementations employ an induction heater to heat the aerosol precursor composition. In some of these implementations, the heating assembly 528 may be configured as an induction heater that comprises a transformer with an induction transmitter and an induction receiver. In implementations in which the heating assembly is configured as the induction heater, the outer cylinder 530 may be configured as the induction transmitter, and the heating element 532 (e.g., plurality of heater prongs) that extend from the receiving base 534 may be configured as the induction receiver. In various implementations, one or both of the induction transmitter and induction receiver may be located in the control body 302 and/or the aerosol source member 304.

In various implementations, the outer cylinder 530 and heating element 532 as the induction transmitter and induction receiver may be constructed of one or more conductive materials, and in further implementations the induction receiver may be constructed of a ferromagnetic material including, but not limited to, cobalt, iron, nickel, and combinations thereof. In one example implementation, the foil material is constructed of a conductive material and the heater prongs are constructed of a ferromagnetic material. In various implementations, the receiving base may be constructed of a non-conductive and/or insulating material.

The outer cylinder 530 as the induction transmitter may include a laminate with a foil material that surrounds a support cylinder. In some implementations, the foil material may include an electrical trace printed thereon, such as, for example, one or more electrical traces that may, in some implementations, form a helical coil pattern when the foil material is positioned around the heating element 532 as the induction receiver. The foil material and support cylinder may each define a tubular configuration. The support cylinder may be configured to support the foil material such that the foil material does not move into contact with, and thereby short-circuit with, the heater prongs. In such a manner, the support cylinder may comprise a nonconductive material, which may be substantially transparent to an oscillating magnetic field produced by the foil material. In various implementations, the foil material may be imbedded in, or otherwise coupled to, the support cylinder. In the illustrated implementation, the foil material is engaged with an outer surface of the support cylinder; however, in other implementations, the foil material may be positioned at an inner surface of the support cylinder or be fully imbedded in the support cylinder.

The foil material of the outer cylinder 530 may be configured to create an oscillating magnetic field (e.g., a magnetic field that varies periodically with time) when alternating current is directed through it. The heater prongs of the heating element 532 may be at least partially located or received within the outer cylinder and include a conductive material. By directing alternating current through the foil material, eddy currents may be generated in the heater prongs via induction. The eddy currents flowing through the resistance of the material defining the heater prongs may heat it by Joule heating (i.e., through the Joule effect). The heater prongs may be wirelessly heated to form an aerosol from the aerosol precursor composition 410 positioned in proximity to the heater prongs.

Other implementations of the aerosol delivery device, control body and aerosol source member are described in the above-cited U.S. patent application Ser. No. 15/916,834 to Sur et al.; U.S. patent application Ser. No. 15/916,696 to Sur; and U.S. patent application Ser. No. 15/836,086 to Sur.

FIGS. 7 and 8 illustrate implementations of an aerosol delivery device including a control body and a cartridge in the case of a no-heat-no-burn device. In this regard, FIG. 7 illustrates a side view of an aerosol delivery device 700 including a control body 702 and a cartridge 704, according to various example implementations of the present disclosure. In particular, FIG. 7 illustrates the control body and the cartridge coupled to one another. The control body and the cartridge may be detachably aligned in a functioning relationship.

FIG. 8 more particularly illustrates the aerosol delivery device 700, in accordance with some example implementations. As seen in the cut-away view illustrated therein, again, the aerosol delivery device can comprise a control body 702 and a cartridge 704 each of which include a number of respective components. The components illustrated in FIG. 8 are representative of the components that may be present in a control body and cartridge and are not intended to limit the scope of components that are encompassed by the present disclosure. As shown, for example, the control body can be formed of a control body housing or shell 806 that can include a control component 808 (e.g., processing circuitry, etc.), an input device 810, a power source 812 and an indicator 814 (e.g., LED, quantum dot-based LED), and such components can be variably aligned. Here, a particular example of a suitable control component includes the PIC16 (L)F1713/6 microcontrollers from Microchip Technology Inc., which is described in Microchip Technology, Inc., AN2265, Vibrating Mesh Nebulizer Reference Design (2016), which is incorporated by reference.

The cartridge 704 can be formed of a housing—referred to at times as a cartridge shell 816—enclosing a reservoir 818 configured to retain the aerosol precursor composition, and including a nozzle 820 having a piezoelectric/piezomagnetic mesh (aerosol production component). Similar to above, in various configurations, this structure may be referred to as a tank.

The reservoir 818 illustrated in FIG. 8 can be a container or can be a fibrous reservoir, as presently described. The reservoir may be in fluid communication with the nozzle 820 for transport of an aerosol precursor composition stored in the reservoir housing to the nozzle. An opening 822 may be present in the cartridge shell 816 (e.g., at the mouthend) to allow for egress of formed aerosol from the cartridge 704.

In some examples, a transport element may be positioned between the reservoir 818 and nozzle 820, and configured to control an amount of aerosol precursor composition passed or delivered from the reservoir to the nozzle. In some examples, a microfluidic chip may be embedded in the cartridge 704, and the amount and/or mass of aerosol precursor composition delivered from the reservoir may be controlled by one or more microfluidic components. One example of a microfluidic component is a micro pump 824, such as one based on microelectromechanical systems (MEMS) technology. Examples of suitable micro pumps include the model MDP2205 micro pump and others from thinXXS Microtechnology AG, the mp5 and mp6 model micro pumps and others from Bartels Mikrotechnik GmbH, and piezoelectric micro pumps from Takasago Fluidic Systems.

As also shown, in some examples, a micro filter 826 may be positioned between the micro pump 824 and nozzle 820 to filter aerosol precursor composition delivered to the nozzle. Like the micro pump, the micro filter is a microfluidic component. Examples of suitable micro filters include flow-through micro filters those manufactured using lab-on-a-chip (LOC) techniques.

In use, when the input device 810 detects user input to activate the aerosol delivery device, the piezoelectric/piezomagnetic mesh is activated to vibrate and thereby draw aerosol precursor composition through the mesh. This forms droplets of aerosol precursor composition that combine with air to form an aerosol. The aerosol is whisked, aspirated or otherwise drawn away from the mesh and out the opening 822 in the mouthend of the aerosol delivery device.

The aerosol delivery device 700 can incorporate the input device 810 such as a switch, sensor or detector for control of supply of electric power to the piezoelectric/piezomagnetic mesh of the nozzle 820 when aerosol generation is desired (e.g., upon draw during use). As such, for example, there is provided a manner or method of turning off power to the mesh when the aerosol delivery device is not being drawn upon during use, and for turning on power to actuate or trigger the production and dispensing of aerosol from the nozzle during draw. Additional representative types of sensing or detection mechanisms, structure and configuration thereof, components thereof, and general methods of operation thereof, are described above and in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference.

For more information regarding the above and other implementations of an aerosol delivery device in the case of a no-heat-no-burn device, see U.S. patent application Ser. No. 15/651,548 to Sur., filed Jul. 17, 2017, which is incorporated herein by reference.

As described above, the aerosol delivery device of example implementations may include various electronic components in the context of an electronic cigarette, heat-not-burn device or no-heat-no-burn device, or even in the case of a device that includes the functionality of one or more of an electronic cigarette, heat-not-burn device or no-heat-no-burn device. FIG. 9 illustrates a circuit diagram of an aerosol delivery device 900 that may be or incorporate functionality of any one or more of aerosol delivery devices 100, 300, 700 according to various example implementations of the present disclosure.

As shown in FIG. 9, the aerosol delivery device 900 includes a control body 902 with a power source 904 and a control component 906 that may correspond to or include functionality of respective ones of the control body 102, 302, 702, power source 212, 524, 812, and control component 208, 522, 808. The aerosol delivery device also includes an aerosol production component 916 that may correspond to or include functionality of heating element 220, 532, or piezoelectric/piezomagnetic mesh of nozzle 820. The control body 902 may include the aerosol production component 916 or terminals 918 configured to connect the aerosol production component to the control body.

In some implementations, the control body 902 includes a sensor 908 configured to produce measurements of air flow. The sensor 908 may correspond to or include functionality of the flow sensor 210, 520 or input device 810. In these implementations, the control component 906 includes a switch 910 coupled to and between the power source 904 and the aerosol production component 916. The control component also includes processing circuitry 912 coupled to the sensor and the switch. The switch can be a Metal Oxide Semiconductor Field Effect Transistor (MOSFET) switch. The sensor may be connected to inter-integrated circuit (I2C), Vcc and/or ground of the processing circuitry.

In some implementations, the processing circuitry 912 is configured to verify the age of a user, and to output a signal (as indicated by arrow 922) to cause the switch 910 to switchably connect and disconnect an output voltage from the power source 904 to the aerosol production component 916 to power the aerosol production component for an aerosol-production time period. In some implementations, the processing circuitry is configured to output a pulse width modulation (PWM) signal. A duty cycle of the PWM signal is adjustable to cause the switch to switchably connect and disconnect the output voltage to the aerosol production component. The age verification and authentication process may be used to determine when the connection is made. If the user is not verified or authenticated, the switch may be disconnected to prevent voltage being provided to the aerosol production component. Alternatively, if the switch is in a disconnected state, then if the user is not verified or authenticated, the switch will remain in a disconnected state. Likewise, when the user is verified or authenticated, switch can establish a connection so that current will be able flow from the charging accessory to the device. In other words, when the user is verified or authenticated, the output voltage is permitted to be provided to the aerosol production component.

The aerosol production component 916 may be controlled in a number of different manners, including via the power provided to the aerosol production component during the aerosol-production time period. In some implementations, at a periodic rate during the aerosol-production time period, the processing circuitry 912 is configured to determine a sample window of measurements of instantaneous actual power provided to the aerosol production component. Each measurement of the sample window of measurements may be determined as a product of a voltage at and a current through the aerosol production component. The processing circuitry of such implementations may be further configured to calculate a moving average power provided to the aerosol production component based on the sample window of measurements of instantaneous actual power. In such implementations, the processing circuitry may be further configured to compare the moving average power to a power set point, and output the signal to cause the switch to respectively disconnect and connect the output voltage at each instance in which the moving average power is respectively above or below the power set point. In one example, the processing circuitry 912 can determine the actual voltage and current (I) through the aerosol production component 916. The processing circuitry can read the determined voltage and current values from analog to digital converter (ADC) inputs of the processing circuitry and determine an instantaneous "actual" power (I*V) directed to the aerosol production component. In some instances, such an "instantaneous" power measurement may be added to a sample window or moving window of values (i.e., other instantaneous power measurements) and then a moving average power of the sample window may be calculated, for example, according to the equation, $P_{avg} = P_{sample} + P_{avg}^{1}/\text{WindowSize}$. In some aspects, for example, the window size may be between about 20 and about 256 samples.

In some examples, the processing circuitry 912 may then compare the calculated moving average power to a power set point. The power set point can be a selected power set point associated with the power source 904 (e.g., a power level or current output from the power source regulated by the processing circuitry 912, or other regulating component associated therewith and disposed in electrical communication between the power source and the aerosol production component 916).

In some examples, (1) if $P_{ave}$ (the actual power determined at the aerosol production component 916) is below the selected power set point (the average power), the switch 910 is turned on so as to allow current flow from the power source 904 to the aerosol production component; (2) if $P_{ave}$ is above the selected power set point, the switch is turned off so as to prevent current flow from the power source to the aerosol production component; and (3) steps 1 and 2 are repeated until expiration or cessation of the aerosol-production time period. More particularly, during the aerosol-production time period, the determination and calculation of the actual power at the aerosol production component, the comparison of the actual power to the pre-selected power set point, and ON/OFF decisions for the switch to adjust the pre-selected power set point may be substantially continuously performed by the processing circuitry 912 at a periodic rate, for example, of between about 20 and 50 times per second, so as to ensure a more stable and accurate average power directed to and delivered at the aerosol production component. Various examples of controlling the switch based on the actual power determined at the aerosol production component (Pave) are described in U.S. Pat. No. 9,423,152 to Ampolini et al., which is incorporated herein by reference.

Although not shown, the processing circuitry 912 and/or the signal conditioning circuitry 914 may be coupled with or receive a signal for authentication or verification from a decentralized structure, such as Blockchain. If the verification or authentication signal is received and correct, then the processing circuitry 912 may turn on the switch 910 to allow operation of the aerosol delivery device. Alternatively or in addition, if the verification signal is not received or not correct, then the processing circuitry 912 may shut off the switch 910 to prevent operation of the aerosol delivery device 900. The structure, operation, and communications with the decentralized identity management is further illustrated in, and described with reference to FIGS. 11-21. U.S. Pat. No. 8,689,804 to Fernando et al. discloses identification systems for smoking devices, the disclosure of which is being incorporated herein by reference. In some implementations, the control component 906 further includes signal conditioning circuitry 914 coupled to the sensor 908 and the processing circuitry 912. The signal conditioning circuitry of such implementations may be configured to manipulate the operation of the switch 910. The signal conditioning circuitry will be described in greater detail below with reference to FIG. 10.

FIG. 10 illustrates a circuit diagram of signal conditioning circuitry 1000 that may correspond to signal conditioning circuitry 914, according to an example implementation of the present disclosure. As shown, in some implementations, the signal conditioning circuitry 1000 includes a signal conditioning chip 1001, and a bidirectional voltage-level translator 1002. One example of a suitable signal conditioning chip is the model ZAP 3456 from Zap-Tech corporation. And one example of a suitable bidirectional voltage-level translator is the model NVT 2003 bidirectional voltage-level translator from NXP Semiconductors.

In one example, as shown in FIG. 10, the signal conditioning chip 1001 can be connected to the bidirectional voltage-level translator 1002, and the bidirectional voltage-level translator can be connected to the 5V input and ground of the processing circuitry 912. Note that the values (e.g., voltage, resistances and capacitance) shown in FIG. 10 are for purposes of illustrating the example only, and unless stated otherwise, the values should not be taken as limiting in the present disclosure.

FIG. 11 illustrates an embodiment of a decentralized identity management system. The system may include decentralized identity information 1102 coupled to or stored within a network 1103. A user 1105 may refer to a user operating a device 1104, or the user 1105 may refer to a user device, such as any computing device (e.g. mobile phone, computer, tablet, laptop, etc.). The user 1105 may be a computing device (e.g. mobile phone, laptop, etc.) that connects with the network 1103 for both providing information to and accessing information from the decentralized identity information 1102. In one embodiment, the user 1105 device may include a charging accessory such as the accessory described in U.S. patent application Ser. No. 16/415,460, entitled "AUTHENTICATION AND AGE VERIFICATION FOR AN AEROSOL DELIVERY DEVICE,", which claims priority to U.S. Provisional App. No. 62/282,222 on Apr. 2, 2019, the entire disclosures of each of which are hereby incorporated by reference. The device 1104 may be any electronic nicotine delivery systems ("ENDS") device including an aerosol delivery device as described above.

The decentralized identity information 1102 may be stored on a network with a decentralized structure for security purposes. One example of a decentralized structure is Blockchain and the decentralized identity information 1102 may include identity information stored in a Blockchain. Specifically, the decentralized structure may be organized such that a block is generated for each transaction and can be a store of data, such as the identity information. The data stored in a block is hashed for storage in chain or tree structure. As each transaction in each block occurs, each block may then be linked to the previous block of transactions. The Blockchain is the arrangement of the blocks in groups. Blockchain may be referred to as a protocol or may include a specific protocol for utilizing Blockchain technology. Being decentralized means that there is not a single point of failure as compared to a centralized database storing the information. A decentralized database built using Blockchain technology may remove the need for centralized institutions and databases. Everyone on the Blockchain may be able to view and validate the transaction. The Blockchain may be further secured by public-key cryptography with a public key being an address on the Blockchain and a private key acting as a password to give an owner access to the data.

The Blockchain structure may be formed from hashchains. A hash function can convert data into a different form. The hash function can be repeated with the results being combined into a series of hashes that may be referred to as a hashchain. In a hashchain, no data can be modified in individual blocks without affecting all subsequent blocks. The public key cryptography may be used to authorize creation of new blocks in the chain. In a Blockchain, there may be hashchains placed inside one another. Because identity information may be sensitive, that information can be stored securely and accurately. Data quality may be based on multiple copies of the Blockchain through database replication due to there being no centralized copy.

A Blockchain network may be used to create a database where anything of value (e.g. property, shares, money, deposits, etc.) can be stored. When the ownership is transferred, everyone in the network may receive notification about the transfer. The majority of the owners on the network may approve the transfers of ownership before being added to the Blockchain as a record that everyone can see. If the owner of the item (e.g. property, asset, cash, etc.) tries to sell the same item to two different entities, everyone on the network will see the duplicate transfer and one of the transfers will be rejected by the network. Blockchain offers improvements in transparency compared to the existing ledgers for many industries, in part by removing intermediaries involved in the record-keeping and in the transfer of assets thus saving costs. The removal of intermediaries allows for increased transaction speeds.

In one embodiment further discussed below, the decentralized identity information 1102 may be used for either identity confirmation or age verification. Accordingly, identity documents (e.g. FIG. 13) may be uploaded to an application that is built on Blockchain technology. This may be done with a mobile device's camera and Internet connection. Once the document is captured by the phone, the image data is hashed, or encrypted, onto the Blockchain. This makes the data invisible by converting it to a string of alphanumerics and splitting the data among different nodes that operate on the Blockchain. Additional security measures may be incorporated to ensure the person uploading the documents matches the person on the identity documents. These measures may include snapping a selfie (image or video) to check for matching facial recognition or uploading credit card information for a credit check for name matching.

The present disclosure contemplates a computer-readable medium that includes instructions or receives and executes instructions responsive to a propagated signal, so that a device connected to a network can communicate voice, video, audio, images or any other data over a network. The user 1105 device may communicate the instructions (e.g. providing information to or requesting information from the decentralized identity information 1102) over the network 1103 via one or more communication ports. The communication port may be created in software or may be a physical connection in hardware. The connection with the network 1103 may be a physical connection, such as a wired Ethernet connection or may be established wirelessly as discussed below. Likewise, the connections with other components may be physical connections or may be established wirelessly.

The network 1103 on which the decentralized structure or Blockchain is stored may be a public network (e.g. the Internet), or it may be a private network that restricts access to certain users (e.g. employees of an organization). A public Blockchain may not have any access restrictions, such that anyone with a network connection could interact. Conversely, a private Blockchain may include permissions for access. The network 1103 may couple devices so that communications may be exchanged, In addition to the user 1105 device, the device 1104 may communicate through a network. As described, a cluster of machines storing data to be analyzed may be connected over one or more networks, such as the network 1103. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple devices, such as the user 1105 device, the device 1104 (and/or the decentralized identity information 1102). The network 1103 may include a wireless network and may employ stand-alone ad-hoc networks, mesh networks, Wireless LAN (WLAN) networks, wireless wide area network (WWAN), wireless metropolitan area network (WMAN), cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, 4G, 5G, or future iterations) cellular technology, or the like. A network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, Zigbee, Z Wave, IEEE 802.16 (e.g., WiMax) and/or other WWAN/WMAN technology, or the like, including future iterations of any of the aforementioned technologies. A wireless network may include virtually any type of wireless communication mechanism by which signals may be communicated between devices, such as the user 1105 device and the decentralized identity information 1102, between or within a network, or the like. In some embodiments, the communication protocols listed above may be used for communications. In other embodiments, the protocol for communication with the decentralized identity information 1102 may be a Blockchain or Blockchain related protocol.

Signal packets communicated via a network, such as the network 1103 or a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address. This signal packet communication may be applicable to the data communication with a Blockchain, such as the decentralized identity information 1102.

FIG. 12 illustrates another embodiment of a decentralized storage system. In particular, the decentralized identity information 1102 of FIG. 11 may be a decentralized age verification 1202 in FIG. 12. In other words, the information that is stored is age related and used for age verification purposes. The decentralized age verification may include age data that is stored using Blockchain technology. Specifically, a user's birthdate may be used to verify the user's age, which may then be used to authenticate the usage of a device 1104, such as alcohol 1206 or cigarettes 1204. Alcohol 1206 and cigarettes 1204 are merely two examples of age restricted devices or substances for which age verification may be needed. In other embodiments, there may be other restrictions other than age for which data is stored decentralized.

The corresponding users 1205, 1207 of the cigarettes 1204 or alcohol 1206 may need to verify an age before purchase or before usage. As described, the decentralized age verification 1202 may not only verify an age (e.g. for an age restricted product), but may also provide authentication or user identification (e.g. for an actual purchase or to prevent theft). The authentication described below may rely on age verification being performed first and then referenced for subsequent authentication. However, there may be other verification mechanisms other than just for age. For example, in some embodiments, user identification may be performed in lieu of age verification.

The cigarette 1204 (e.g. an electronic cigarette or an ENDS device) may allow the flow of electricity if authentication passes, or, if authentication fails, the flow of electricity may be stopped to prevent usage. This authentication may be a process for verifying a user's identity from the decentralized identity information 1102 or verifying a user's age from the decentralized age verification 1202. The authentication or verification may include verifying a user's identity and/or a user's age. The initial age verification process or registration process may occur less frequently (e.g. at device purchase) than the authentication process (e.g. each usage, or based on puffs or puff time). However, both age verification and authentication are based on utilizing data from a decentralized structure (e.g. 1102 or 1202).

The user (1105, 1205, or 1207) may provide identity information to the decentralized identity information 1102 or the decentralized age verification 1202. Both decentralized structures may be based on Blockchain technology. The identity information provided may include the information described with respect to FIG. 13. This data can then be used different ways, including for age verification of age-restricted products, such as alcohol 1206 and cigarettes 1204. The identity data communicated with the decentralized age verification 1202 may be a single communication with a multiple items, such that the data is stored in a single block. Conversely, identity data communicated separately may be multiple blocks added to a chain.

FIG. 13 illustrates an example of personal identification information 1302. The personal identification information 1302 may include information that is used for identifying or authenticating a user or device. The personal identification information may include a user's name 1306. The user's birthdate 1308 may also be stored and used for age verification. Other contact 1310 information, such as an email address, mailing address, and/or phone number may be personal identification information 1302 that is stored in a decentralized structure. The user's driver license 1312 may also be stored. The storage may just be the driver's license number or may include a scan of the driver's license that is used for age verification. For example, a user may use a selfie or selfie video that is compared with the driver's license image that is stored in a decentralized structure. In some embodiments, a social security number 1314 may be additional personal identification information that is stored. FIG. 14 illustrates how certain personal identification information 1302 may be stored in a traditional centralized database, while other information is stored in a decentralized structure, such as with Blockchain technology.

Biometrics 1316 may be another form of personal identification information 1302. Biometrics of a user may be detected and used for age verification by accessing the biometric 1316 information stored in the decentralized identity structure. Example biometrics 1316 include fingerprints, facial recognition, iris/eye recognition, blood, or DNA. In one example, the biometrics 1316 stored in the decentralized identity structure may be accessed from that structure for a user (e.g. 1105, 1205, 1207) to authenticate or verify usage of restricted device 1104, such as alcohol 1206 or cigarettes 1204. In one example, when the device 1104 or cigarette 1204 is an ENDS device, then a user may be required to apply their fingerprint to a biometric sensor that is compared with the biometrics 1316 stored in the decentralized identity structure to authenticate the user or verify the user's age. This process may be required periodically, such as upon usage of a new cartridge. Alternatively, the periodicity of re-authentication can be varied and may be based on time, number of puffs, charges status (e.g. each charging cycle), and/or other triggers. Biometrics 1316 may include facial recognition. The facial recognition technology may be used for comparing two images to either confirm identity match, reject identity verification, or flag the verification to request additional identification information.

The personal identification information 1302 may include usage data 1318. For example, for an ENDS device 1204, the usage data 1318 may include data about frequency of usage, length of usage, number of puffs, length of puffs, etc. The usage data 1318 may include product type usage, such as nicotine usage, cartridge flavor purchase/usage, and location of usage. This usage data may be stored in the decentralized storage using Blockchain technology. Finally, the personal identification information 1302 may include example mechanisms to verify the user's age. There may be identification documentation that is stored to the decentralized location. The identification documentation may include a driver's license or passport. The image from that documentation may be used for future age verification.

FIG. 14 illustrates an example storage structure for personal identification information 1302. The centralized structure 1406 may include a database that tracks certain user data, while other user data is stored in the decentralized structure 1404, such as with Blockchain technology. In one embodiment, the more sensitive data (e.g. social security, driver's license, credit card info, etc.) may be stored with Blockchain in the decentralize structure 1404, while less sensitive data (e.g. name, address, etc.) may be stored in centralized structure 1406, such as a database. Hashing the more sensitive/private information can give consumers confidence that their private data is secure and not visible to a company, while still allowing the company to blindly access that information for identity confirmation and/or age verification. The identity information in either structure may be encrypted and/or use anonymous identifiers (e.g. numbers, letters, or any alphanumeric identifiers) for each user.

FIG. 15 is a flow chart illustrating an example purchase process. In one embodiment, there may be a vending machine, dispensing device, or kiosk for a point of sale. A consumer wishing to purchase an age restricted product (e.g. ENDS device) from the vending machine, dispensing device, or kiosk would need to confirm identity and/or verify their age. There may be a requirement for identification documentation (driver's license/passport) and/or biometrics for at least an initial registration step (i.e. initial age verification), then subsequent attempts to purchase may just require attestation 1502. In an alternative embodiment, the purchase process and the attestation may be online. The attestation 1502 may include any of the personal identification information 1302 from FIG. 13. Additionally or alternatively, the user may need to provide a selfie or a video selfie to confirm identity. The attestation is analyzed 1504 to determine if it is a confirmed identity and/or a verified age. If the attestation is correct, the product (e.g. ENDS device or cartridge) can be dispensed 1506. In the example of an online purchase process, the dispensing 1506 may include shipment of the product. If the attestation is not correct, then the product is denied 1508 and not provided. If the attestation is questionable, then additional information can be requested 1510 for additional analysis 1504. For an online purchase, the additional information 1510 may be other identity information that the user is required to upload. In the vending machine embodiment, the connected vending machine may communicate with a purchaser's computing device (e.g. mobile phone) and receive the verified age information necessary to complete a legal purchase. In addition, the purchaser could also opt-in to sharing certain additional personal identifying information (e.g. email, phone number, address, etc.) in exchange for a coupon, or other item of value.

The example dispensing devices, vending machines, or kiosks may also be mobilized. For example, the vending machines may be equipped to be driven to popular vaping locations and parked as a pop-up vape shop. They might also be autonomously controlled, where consumers who want to purchase tobacco products (e.g. ENDS devices, cartridges, and accessories) can summon the roving vending machine to a certain location. The autonomous roving vending machines might also be of the aircraft type, but be enabled with age verification software and connected to a network, such as the Internet. The vending devices may also be outfitted in taxis, trains, and other methods of transportation for on-the-go age-verified purchases. By relying on a decentralized structure for storing personal identifying information, a consumer has a reliable and safe mechanism for verifying their age for completing a purchase with less risk of under-age purchases.

FIG. 16 is a flow chart illustrating another example of a purchase process. FIG. 16 may be a purchase process similar to FIG. 15. A vendor 1602 may include any retail outlet, such as vending machine, dispensing device, or kiosk or other point of sale locations, including stores. The vendor receives an attestation from the user. A correct attestation goes to the decentralized identity location or the Blockchain 1606, where a correct attestation is accepted and the product is dispensed 1612. An incorrect attestation goes to the decentralized identity location or the Blockchain 1604, where an incorrect attestation results in a denial 1610 of providing the product. Although not shown, the Blockchain systems 1604, 1606 may be a single Blockchain system. If the attestation is questionable, then that attestation may be flagged and more information is requested 1608. Based on the analysis of that additional info, the flag may be accepted (i.e. the attestation is flagged as questionable) and the product is denied 1614. Conversely, if the flag is rejected (i.e. the attestation was flagged as potentially having issues, but those issues were rejected), then the product may be dispensed 1616.

FIGS. 17-18 describe how the initial age verification may occur based on storage of data to a decentralized location with Blockchain technology, so future age verification requests (i.e. authentications) by that user may access the information from the decentralized location. Specifically, once a user is initially age verified and stored with Blockchain technology, future verifications (i.e. "authentications") may be merely calls to this decentralized location for unlocking the device 1104. In other words, in such embodiments, a user initially performs an age verification and then subsequent usage may require authentication without the complete initial age verification requirements. The frequency with which the device 1104 must be unlocked or authenticated can vary. Likewise, the timing for when a user needs to re-verify their age may vary. For example, each time the cartridge is replaced, the user may need to re-verify or re-authenticate. In some embodiments, the re-authentication may be required after a certain number of puffs from the device 1104 or may be based on the passage of time (e.g. once per hour, day, week, month, etc.).

FIG. 17 is a flow chart illustrating a process for utilizing a decentralized identity management system. An item is purchased in block 1702. As part of the purchase process, the user may need to register the item in block 1704. The registration is further described in U.S. patent application Ser. No. 16/415,444, filed concurrently and entitled "AGE VERIFICATION WITH REGISTERED CARTRIDGES FOR AN AEROSOL DELIVERY DEVICE," the entire disclosure of which is herein incorporated by reference. The registration may include providing personal information to a decentralized storage structure (i.e. Blockchain structure) in block 1706. In one embodiment, The user then authenticates the device that was purchased in block 1708. The authentication includes accessing the decentralized storage for authentication in block 1710. The accessing may include retrieving personal identifying information. If authentication 1712 fails, then the process returns to the user needing to authenticate the device in block 1708. If authentication 1712 passes, then the device is ready for usage in block 1714 and the user can continue usage until the authentication expires 1716. In one embodiment, the device registration may include the purchaser sending a Blockchain-validated verification to the device (e.g. ENDS device), which then permits a one-time biometric key capture. This biometrics data is stored on the device and used as authentication for every session or puff activation.

Decentralized identity management may also be used to verify the identity and age of a consumer during an ENDS device registration. The purchaser of the ENDS product who has been verified could similarly use a wired or wireless connection to interact with the ENDS device itself. During device registration, the purchaser sends a Blockchain-validated verification to the device, which then permits a one-time biometric key capture. Biometrics data is stored on the ENDS device (or on a user's mobile device associated with the ENDS device) and used as authentication for every session or puff activation. Biometric data may also be hashed to the Blockchain for online authentication. Prior to beginning a vaping session, the user may scan a biometric (e.g. face or finger). This data may be sent for a validation check on the Blockchain. In one embodiment, the data is sent from a mobile device that is coupled with the ENDS device. Once a new block is formed and a validation is sent back, the ENDS device may be unlocked for a determined amount of time (e.g. based on time, usage, puffs, etc.). Storing this data on a mobile device may be useful for consumers to skip the registration process if their device was ever lost or stolen. Specifically, the data is backed up in a decentralized, un-hackable form, such as a Blockchain.

At the point of sale 1702, the user may be required to verify their age. For example, for a purchase at a store, a store clerk may be required to view the user's identification and then input that information online for storage with the Blockchain. Alternatively, at the time of purchase, the user may be required to register the purchase online or with an app. In one embodiment, there may be a kiosk or other mechanism at the time of purchase through which the user can interact to provide a consistent registration process between different retailers. The retail location may further be outfitted with a "tap to verify" kiosk that is located near a payment kiosk. The kiosk may be provided and operated by the seller of the ENDS device. For example, this could be incorporated into existing VERIPHONE payment kiosks or be a standalone kiosk that is provided to retailers. Either way, the consumer may provide a verified age by scanning a code (a 2D or 3D bar code, such as a QR code) that is located at the point-of-sale or appears on the pre-purchase screen for an online purchase. The registration process may include providing proof of age. This age verification process may occur at the time of each purchase. In alternative embodiments, the initial age verification may take place once and the user may create a profile (online or with an app) that can be associated with all future purchases that is used for authentication. The age verification of the purchaser is communicated via wired or wireless connection (e.g. NFC, Bluetooth, or other) with a Blockchain to enable or permit a purchase of an age-restricted product, such as an ENDS device.

In one embodiment, the verification may be required for trade marketing consumer engagement. Once the user has been verified by a Blockchain application, they can engage with a trade marketing representative to discuss products. There may be "21+ verification" to the trade marketing representative without disclosing the actual age for user privacy. The user can opt-in to receive marketing materials and coupons if desired by selectively sharing certain of the personal identifying information or by verifying their age on the Blockchain application. The verification information may be sent to the trade marketing representative via NFC, Bluetooth, or other wired or wireless connections, or by using a kiosk or tablet on-site.

FIG. 18 is a flow chart illustrating a process for age verification with a decentralized identity management system. A consumer may establish a personal profile that includes personal information in block 1802. The personal information is provided to a decentralized storage structure, such as a Blockchain structure in block 1804. In order to verify an age, that personal information is accessed from the decentralized storage structure in block 1806. If verification 1808 is not successful, different personal information 1806 may be accessed. If the age is verified, then the purchase can proceed 1810.

FIG. 19 is a flow chart illustrating a tracking example for a product with a decentralized identity management system. In block 1902, the decentralized storage (e.g. Blockchain) is established for a product. In block 1904, nodes are added to the decentralized storage for each step in a product's life. Example steps in a product life include but are not limited to the examples shown and described with reference to FIG. 20. In block 1906, the information stored in the decentralized identity management is accessed for monitoring and tracking the product.

FIG. 20 illustrates example information from a decentralized identity management system 2002. The information 2002 may include notes added to a Blockchain for following the steps of a particular product. The tracking information may include chain of custody 2006 for following where and to whom a product goes. It tracks from the raw materials 2008 and details on manufacturing 2010 with Blockchain technology. Likewise, the packaging 2012 and the sale/shipping 2014 information may also be tracked with Blockchain. Finally, transfers 2016 follow a product between users. All of this information 2002 may be sensed and recorded as a new block on the network. Due to the nature of Blockchain, each subsequent block includes all the information of the previous block, as well as the newly written line due to its associated processing step. The information 2002 may be used for identifying and tracing illegal or underage sales, or may be used for quality control measures.

Although the decentralized data storage is described as being used for age verification purposes, it may also be used for payment processing. For example, the identity information may be used to confirm an identity for making a payment. Alternatively, the identity information may include a payment method (e.g. credit card number) that is stored in the decentralized data storage. Accordingly, that payment information may be extracted (along with identity and/or age) for making a purchase. The transaction data may be stored as block in the decentralized data storage using Blockchain technology. The transaction data may include payment processing for payments that include cryptocurrency. Accordingly, there may be a Blockchain associated with the cryptocurrency that may be separate from or included with the Blockchain for the payment processing or transaction data. In another embodiment, the cryptocurrency may be specific to the brand or product. For example, there may be a cryptocurrency that is specific to the purchase of ENDS devices that could be backed by a product OEM, brand, group of such brands, retailer, etc.). This cryptocurrency may include the age verification and identity management functionality (discussed above) into the same Blockchain along with cryptocurrency/payment transaction services. The age verification and identity management could be separate blocks from the cryptocurrency/payment transaction services. Alternatively, they may be recorded in the same or successive blocks organized based on user identity.

FIG. 21 is a flow chart illustrating a transaction in a decentralized identity management system. Specifically, the transaction data may include data from a cryptocurrency or may include a purchase using the cryptocurrency. A transaction is initiated 2102 that may include a request for a transaction. This may be a request for funds or payment information. The transaction requested is submitted to a network 2104. The transaction can be validated 2106, such determining an identity of a user and verifying an age of the user for age-restricted products. With Blockchain technology, the validation 2106 may further include verifying the transaction according to the requirement of that particular Blockchain. A new block is created 2108 with the data for the transaction. This new block can be added to the existing Blockchain 2110. Specifically, the new block is added to a Blockchain that records other data/information including prior transactions. The new blocks that are added to the existing Blockchain may be a permanent record on that Blockchain. Accordingly, the addition of any data (e.g. identity data or age verification data) to the decentralized identity storage may be added as a new block to an existing Blockchain (e.g. for a particular user or particular type of data).

The transaction data that is stored on a decentralized identity storage (e.g. Blockchain) may be used for enforcing other parameters for ordering other than just verifying age. For example, there may be a limit to the number of device purchases (or cartridge purchases), such as N purchases in a particular time period. With this limitation, there may be a pre-purchase verification included in the Blockchain and using transaction data to verify that a user attempting to purchase has not exceeded those purchase permissions. This may be used not only for online ordering, but also for in-person purchases at vending machines, kiosks, retail outlets, etc. in order to prevent a user from exceeding the permissions by purchasing in multiple locations. Each purchase can be aggregated into the decentralized identity storage (i.e. a new block added to the chain for each purchase). This aggregation of transaction data can be used to enforce policies across multiple OEMS, various stores, for various products, etc. In another example, transaction data may be stored for a cartridge (or other consumable) and may include a unique identification associated with the cartridge. There may be secondary validation upon connecting the cartridge with device in order to verify that the user that is now using the cartridge is the user who made the purchase. This transaction data can be stored on the Blockchain in association with a particular user.

The foregoing description of use of the article(s) can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article(s) illustrated in FIGS. 1-21 or as otherwise described above may be included in an aerosol delivery device according to the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed, and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for identity and age verification for tobacco products, the system comprising:
   a network;
   a decentralized storage of data coupled with the network, the decentralize storage comprising a plurality of replica databases;
   a user device coupled with the network and configured to communicate with the decentralized storage, wherein the communication comprises personal identifying information about the user sent from the user device for storage at the decentralized storage, further wherein the personal identifying information is accessed at the decentralized storage for identifying a user and verifying an age of the user when purchasing or using a tobacco product; and
   an aerosol delivery device configured to communicate with the user device;
   wherein the personal identifying information is sent to the plurality of replica databases on the network for decentralized storage of the personal identifying information;
   wherein each replica database within the plurality of replica databases on the network is capable of performing a verification comprising receiving and validating an age verification when purchasing or using a tobacco product based on the personal identifying information;
   wherein tracking information associated with the tobacco product is sent to the plurality of replica databases for decentralized storage with a unique identifier for the tobacco product, the tracking information comprising chain of custody information associated with transfers of the tobacco product to different entities;
   wherein, in association with a purchase of the tobacco product by the user, at least one of the plurality of replica databases is accessed to perform age verification of the user for purchase of the tobacco product;
   wherein, in response to a purchase by the user of a tobacco product, the unique identifier of the tobacco product is received and stored by the plurality of replica databases on the network for decentralized storage in association with the personal identifying information of the user;

wherein the aerosol delivery device is configured to permit outputting an aerosol in response to an age verification of the user in association with the personal identifying information of the user stored by the plurality of replica databases;

wherein the aerosol delivery device is further configured to perform a secondary validation to verify, via at least one of the plurality of replica databases, that the user of the aerosol delivery device is a same user that purchased the tobacco product;

wherein the aerosol delivery device is further configured to receive a decentralized storage-validated verification associated with purchase of the tobacco product, perform a one-time key capture with the key being stored on the aerosol delivery device in response to receipt of the decentralized storage-validated verification at the aerosol delivery device, and perform subsequent authentications of the user based on the key stored on the aerosol delivery device, the decentralized storage-validated verification being provided to the aerosol delivery device in response to a validation performed against data of at least one of the plurality of replica databases.

2. The system of claim 1, wherein the tobacco product is the aerosol delivery device, wherein operation of the aerosol delivery device is controlled based on receipt of the verification to permit generation of an aerosol from the consumable cartridge.

3. The system of claim 2, wherein operation of the aerosol delivery device is inhibited to prevent generation of the aerosol from the consumable cartridge if the verification is not received.

4. The system of claim 1, wherein the personal identifying information is stored in each of the plurality of replica databases as a hashed block in a tree or chain data structure.

5. The system of claim 1, wherein each replica database is capable of receiving requests for age verification to permit verification of the requests and responses between the replica databases.

6. The system of claim 1, wherein the user device is configured to perform comparison for the age verification and the secondary validation, and the user device is further configured to, in response to the comparison, flag the age verification or the secondary validation and request additional identification data to complete the age verification or the secondary validation.

7. The system of claim 1, wherein the personal identifying information is first personal identifying information comprising driver's license information for the user, the first personal identifying information being stored in the decentralized storage;

wherein the system further comprises a centralized storage that stores second personal identifying information for the user, the second personal identifying information comprising a name of the user;

wherein the age verification and the secondary validation comprise accessing the first personal identifying information and the second personal identifying information.

8. The system of claim 1, wherein the aerosol delivery device is configured to capture aerosol delivery device usage data for a user and communicate the aerosol delivery device usage data to the decentralized storage for storage in the plurality of replica databases in association with the user, the usage data comprising usage frequency, usage duration, number of puffs, and puff duration.

9. The system of claim 1, wherein the usage data may further comprise nicotine usage and consumable cartridge flavor usage.

10. A method for providing a tobacco product that is age-restricted, the method comprising:

storing personal identifying information for a user in a decentralized storage comprising a plurality of replica databases on a network, wherein each replica database within the plurality of replica databases is capable of receiving and validating an age verification request in association with a purchase of the tobacco product based on the personal identifying information;

receiving the age verification request at the decentralized storage in association with the purchase of the tobacco product;

providing, from the decentralized storage in response to receiving the age verification request, a verification response based on a verification of information provided in the age verification request against the personal identifying information stored in the decentralized storage to verify an age of the user in association with the purchase of the tobacco product;

storing, in response to the purchase, a unique identifier of the tobacco product in the decentralized storage in association with the personal identifying information of the user;

receiving and storing tracking information associated with the tobacco product at the plurality of replica databases for decentralized storage with the unique identifier for the tobacco product, the tracking information comprising chain of custody information associated with transfers of the tobacco product to different entities;

wherein the verification response is provided to an aerosol delivery device that is configured to permit outputting of an aerosol in response to an age verification of the user associated in association with the personal identifying information of the user stored at the plurality of replica databases;

wherein the method further comprises verifying, with at least one of the plurality of replica databases, and sending a verification to the aerosol delivery device that the user of the aerosol delivery device is a same user that purchased the tobacco product;

wherein the method further comprises sending a decentralized storage-validated verification associated with purchase of the tobacco product to the aerosol delivery device, wherein the aerosol delivery device performs a one-time key capture and stores the key on the aerosol delivery device in response to receipt of the decentralized storage-validated verification and performs subsequent authentications of the user based on the key stored on the aerosol delivery device, the decentralized storage-validated verification being provided to the aerosol delivery device in response to a validation performed against data of at least one of the plurality of replica databases.

11. The method of claim 10, wherein storing the personal identifying information for the user comprises storing transaction data from a payment transaction associated with the purchase of the tobacco product;

wherein the personal identifying information further comprises payment information for making the purchase; and wherein the verification comprises extracting payment information including a payment method from the personal identifying information to perform the payment transaction.

12. The method of claim 10, wherein the aerosol delivery device does not operate unless the age of the user is verified using the personal identifying information from the decentralized storage for that user.

13. The method of claim 10, wherein transaction data from the payment transaction is added to the decentralized storage and associated with the personal identifying information.

\* \* \* \* \*